US005485613A

United States Patent [19]
Engelstad et al.

[11] Patent Number: 5,485,613
[45] Date of Patent: Jan. 16, 1996

[54] METHOD FOR AUTOMATIC MEMORY RECLAMATION FOR OBJECT-ORIENTED SYSTEMS WITH REAL-TIME CONSTRAINTS

[75] Inventors: Steven L. Engelstad, Lisle; Keith F. Falck; James E. Vandendorpe, both of Naperville, all of Ill.

[73] Assignee: AT&T Corp., Murray Hill, N.J.

[21] Appl. No.: 210,107

[22] Filed: Mar. 17, 1994

Related U.S. Application Data

[63] Continuation-in-part of Ser. No. 750,797, Aug. 27, 1991, abandoned.

[51] Int. Cl.$^6$ ........................................... G06F 17/00
[52] U.S. Cl. ........................... 395/650; 364/DIG. 1; 364/281.1
[58] Field of Search ........................... 395/425, 650, 395/600

[56] References Cited

U.S. PATENT DOCUMENTS

| | | | |
|---|---|---|---|
| 4,121,286 | 10/1978 | Venton et al. | 364/DIG. 1 |
| 4,592,048 | 5/1986 | Beckner et al. | 370/60 |
| 4,695,949 | 9/1987 | Thattle et al. | 395/600 |
| 4,755,939 | 7/1988 | Watson | 395/600 |
| 4,775,932 | 10/1988 | Oxley et al. | 395/600 |
| 4,800,520 | 1/1989 | Iijima | 395/600 |
| 4,907,151 | 3/1990 | Bartlett | 364/DIG. 1 |
| 4,912,629 | 3/1990 | Shuler, Jr. | 395/600 |
| 4,914,586 | 4/1990 | Swinehart et al. | 395/600 |
| 4,961,137 | 10/1990 | Augusteijn et al. | 364/DIG. 1 |

(List continued on next page.)

OTHER PUBLICATIONS

"The Calico Programming Language and Development Environment", *Software Infrastructure Group, AT&T Bell Laboratories*, Modified Jun. 17, 1991.
"A Dynamic C-Based Object-Oriented System for Unix", *IEEE Software*, pp. 73–85, May 1991.
"The 5ESS Switching System", *AT&T Technical Journal*, vol. 64, Jul.–Aug., 1985, No. 6, Part 2, pp. 1303–1564, K. E. Martersteck and A. E. Spencer, Jr.
"A Real–Time Garbage Collector Based on the Lifetimes of Objects", *Communications of the ACM*, vol. 26, No. 6, Jun., 1983, Henry Lieberman and Carl Hewitt, pp. 419–429.
"No. 5 ESS–Serving the Present, Serving the Future", *Bell Laboratories Record*, Dec., 1981, pp. 290, 293, Jerry M. Johnson, James C. Kennedy, and Jack C. Warner, vol. 59, No. 10, 0005–8564.
"No. 5 ESS–Versatile, Flexible, Forward Looking", *Bell Laboratories Record*, pp. 258, 263, Nov., 1981, Thomas E. Browne (AT&T), James C. Ewin, and Gerard P. O'Reilly, vol. 59, No. 9, 0005–8564.
"A Real Time Garbage Collector That Can Recover Temporary Storage Quickly", *Massachusets Institute of Technology Artificial Intelligence Laboratory*, A. I. Memo No. 569, Apr., 1980, Henry Lieberman, Carl Hewitt, pp. 1–27.
"Object Oriented Software Technologies Applied to Switching System Architectures and Software Development Processes", *XIII International Switching Symposium*, vol. 2, May 27–Jun. 1, 1990, pp. 97–106, E. C. Arnold and D. W. Brown.

*Primary Examiner*—Thomas M. Heckler
*Attorney, Agent, or Firm*—Michael B. Johannesen

[57] ABSTRACT

A method for memory reclamation for object-oriented program-controlled systems with real-time constraints. Resource reclamation, commonly called garbage collection, in object-oriented systems is segmented into discrete, real-time bounded segments. Scheduling of the segments is controlled so that garbage collection is unobtrusive to the system, while memory resources are reclaimed at approximately the same rate as they are allocated. Objects referenced from other objects are checked via an incremental mark/sweep method. Objects referenced from stacks are also accounted for. If a stack cannot be swept for object references in one real-time segment, the stack is copied into a save area and swept during one or more subsequent real-time segments.

31 Claims, 12 Drawing Sheets

U.S. PATENT DOCUMENTS

| | | | |
|---|---|---|---|
| 4,989,132 | 1/1991 | Mellender et al. | 395/600 |
| 5,025,367 | 6/1991 | Gurd et al. | 395/600 |
| 5,075,848 | 12/1991 | Lai et al. | 395/425 |
| 5,088,036 | 2/1992 | Ellis et al. | 395/425 |
| 5,136,706 | 8/1992 | Courts | 395/600 |
| 5,218,698 | 6/1993 | Mandl | 395/650 |
| 5,241,673 | 8/1993 | Schelvis | 395/600 |
| 5,274,804 | 12/1993 | Jackson et al. | 395/600 |
| 5,321,834 | 6/1994 | Weiser et al. | 395/600 |

METHOD FOR AUTOMATIC MEMORY RECLAMATION FOR OBJECT-ORIENTED SYSTEMS WITH REAL-TIME CONSTRAINTS

This application is a continuation-in-part of U.S. patent application Ser. No. 07/750,797, filed Aug. 27, 1991 now abandoned.

CROSS-REFERENCE TO RELATED APPLICATION

This application is related to the U.S. patent application Ser. No. 07/750,796, abandoned, entitled Method For Automatic System Resource Reclamation For Systems With Real-Time Constraints having the same inventors and filed concurrently with this application.

TECHNICAL FIELD

This invention relates to data processing systems, and more specifically to a method for automatic storage management for object-oriented program-controlled systems with real-time constraints.

BACKGROUND OF THE INVENTION

In continuously operating, real-time systems, deallocation of system resources is an area where minor errors have major consequences. If errors occur in resource deallocation, or the system gets into an unusual state, resources are lost to processing and to the users of the system. Lost resources can cause delays, and in some cases, lead to system failure. Under current practice, the system programmer must carefully and thoroughly design and implement deallocation of resources such as memory, peripheral devices and, in electronic telephone switching systems, lines, ports, service circuits and the like.

These programming practices are complex and prior art solutions to this problem are inadequate. In procedural program-controlled systems, audits are used to recover lost resources. Audits, however, are themselves complex to design and to implement properly, and require a substantial amount of system real-time to carry out their function. Further, audits have not yet been designed that can effectively handle all possible situations that may be encountered in a continuously operating system. Initialization of part or all of the system is the only alternative in some cases, which can have severe impact on a switching system or other systems requiring long-term reliability.

Object-oriented program-controlled systems have been proposed as an alternative to procedural program-controlled systems because, by their very nature, they increase productivity of programmers and because some object-oriented program-controlled systems include a form of automatic resource deallocation. As will be discussed in more detail below, these systems have not yet addressed the problems of recovering resources at a rate proportionate to the rate of allocation and do not run without blocking all other processing of the system for significant and unpredictable periods of time. To understand these problems, an understanding of object-oriented programming systems is necessary.

An object-oriented program-controlled system, at its basic level, is concerned with objects, messages and the interaction between the two. Processing in these systems is defined as sending messages to objects. Objects generally comprise data used by the system and messages generally comprise operations to be performed on an object's data. Objects are long-lived (as compared to messages) and require space in memory, which is allocated at the time of creation of the objects. Object-oriented program-controlled systems create objects frequently, for each new or different functionality required by processing. Therefore, as in procedural program systems, memory space is a resource that must be recycled carefully so that memory resources do not become totally exhausted, making further processing impossible.

When the data that an object represents is no longer useful, its resources may be discarded, and the memory for storing that data may be reallocated. Data in an object may include references to other objects to which messages may be sent as part of processing. A message may stimulate an object to add, delete or change a reference to another object. When all references to an object or group of objects are deleted, these objects become "unreachable," and hence the object or objects are no longer useful, and the memory resources for storing that object or objects should be recovered.

It is the nature of objects that there is a limit to the number of references that they may have at any given time. Operations on objects cause new objects to be created. As a result, references to previously used objects are normally deleted as the functionality of a prior object is no longer needed; this makes available the space for references to objects, which space may be reused for the new objects. An object becomes unreachable when all of the referencing objects delete all references to that object. The reference storage space of unreachable objects can be reused to reference other objects.

Several object-oriented program-controlled systems utilize a form of automatic storage management called "garbage collectors," to recover memory resources. Generically, garbage collectors identify unreachable objects and return resources associated with identified unreachable objects to a pool of available resources. Most garbage collectors also include a form of memory compaction, which moves reachable objects so that they are substantially contiguous in memory. A problem in the art is that most garbage collectors stop all other activity of the object-oriented programming system for a significant, unpredictable duration of time while the garbage collector is running, which makes them unsuitable for systems with real-time constraints.

A common garbage collector that stops all other activity while it is running is the mark/sweep garbage collector. In mark/sweep garbage collectors, the "mark" phase uses a set of root objects as a basis for a recursive traversal of the graph of objects referenced directly or indirectly by the root objects, marking all objects reachable from the root set. In the "sweep" phase, all objects are sequentially examined. Objects that are not marked are deleted and objects that are marked are unmarked and saved. Obviously, the time required for the mark/sweep garbage collector to complete its task is at least proportional to the size of the system. For systems with real-time constraints, the uncontrolled time delay while the garbage collector runs is unacceptable.

In response to the need for a non-disruptive garbage collector, C. Hewitt and H. Lieberman proposed a garbage collector for an object-oriented program-controlled system in Hewitt/Lieberman, "A Real Time Garbage Collector That Can Recover Temporary Storage Quickly," MIT Artificial Intelligence Laboratories, A. I. Memo No. 569, April, 1980, which, to our knowledge, has never been implemented. This relatively more sophisticated garbage collector is based on two statistical observations: 1. recently created objects are more likely to become unreachable than older objects, and 2. objects mostly reference contemporary or prior-created objects. In order to take advantage of these two observations, Hewitt/Lieberman group objects into "generations" according to time of creation of the object. Each generation has a predetermined storage size; therefore, the number of objects in a generation may vary. Identification of unreachable objects is focused on the most recently created generations, since, according to observation 1, these generations contain objects that are most likely to become unreachable. This garbage collector selects a "condemned generation" and causes the condemned generation and all generations younger than this generation to form a "condemned region." By focusing on objects within a condemned region and not on all objects, this garbage collector is more efficient (i.e., recovers more memory per unit of processing time) than basic mark/sweep garbage collectors.

Observation two provides an additional efficiency in the Hewitt/Lieberman garbage collector over mark/sweep garbage collectors. Because objects mostly reference contemporary or prior-created objects, the number of references to an object in one generation from a prior generation is generally not large. Thus, it is practical to keep a list of such references from a prior generation associated with each generation. Traversing this list sufficiently identifies all object references from older generations into generations in the condemned region. Therefore, by using this list, this garbage collector avoids searching generations older than the condemned region for references into the condemned region. Thus, the Hewitt/Lieberman garbage collector collects more unreachable objects per unit processing time than basic mark/sweep garbage collectors.

In the Hewitt/Lieberman garbage collector, the list of references to objects in a younger generation from objects in an older generation is called a "remembered set". A "remembered set" associated with a generation stores or "remembers" the "set" of references to objects in the associated generation from objects in older generations. During processing, references can be created through assignments. When assignment processing detects the creation of a reference to an object belonging to a younger generation from an object in an older generation, the reference assignment is "trapped", and data regarding the older object is recorded in the remembered set data structure of the generation to which the referenced object belongs. According to observation 2, these traps occur infrequently, so that the overhead incurred by the trap is gained back in the efficiency of the garbage collector. By using a remembered set of references from older objects, the garbage collector is simplified because the effort needed to search older objects for references to younger objects is greatly reduced.

An area not addressed by Hewitt/Lieberman is one of the primary causes of time delay in garbage collectors: the marking and sweeping of objects referenced from stacks. Processing of the system must stop for the marking of objects referenced from each stack because a reference to an object from a stack can move, undetected by the garbage collector, if the system is allowed to run while the stacks are being checked for references. For example, consider an object referenced from the bottom of a stack, wherein stacks are swept from the top down. The referenced object would not be marked (and therefore considered to be unreachable) at the start of the stack sweep. If the stack were swept to a point before the reference to the object and then the system permitted to run, the reference to the object could move to a part of the stack that had already been swept. As a result, the referenced object would not be marked, and, during the sweep phase, the referenced object would be falsely recovered, i.e., freed for reallocation. Recovering a referenced object could potentially cause system malfunction. Therefore, a problem in the art is that, even in relatively efficient garbage collectors, (such as the Hewitt/Lieberman system) stacks cannot be checked for object references without locking out other processing.

Even with its efficiencies, the proposed Hewitt/Lieberman garbage collector is not a complete solution for the needs of a program-controlled real-time operating system. The condemned region is still searched in the above-discussed mark/sweep fashion using an unpredictable amount of real time. No mechanism is discussed by Hewitt/Lieberman to control the rate at which garbage collection progresses. In real-time systems, these are significant problems, which could result in degradation of system performance.

A further problem in the art is that current garbage collectors, including Hewitt/Lieberman, often compact storage as part of the identification of reachable objects. In systems where the number and kind of objects do not change greatly, frequent compaction is an unnecessary real-time expense. Compaction in such systems is required much less often. This is especially true for applications in, for example, electronic telephone switching systems, where a limited number of classes of objects are used, but a large number are created and discarded during typical call processing.

A problem in the art, therefore, is that there is no garbage collector satisfactory for use in real-time object-oriented program-controlled systems.

SUMMARY OF THE INVENTION

This problem is solved and a technical advance is achieved in accordance with the principles of the invention, in an exemplary method for memory reclamation for use by a digital data processing system performing real-time operations wherein a cycle is a predetermined period of real time, and wherein steps of the method comprise one or more cycles of operation, each of the cycles comprises one or more tasks comprising a non-decomposable operation of the recovery process and wherein each pair of adjacent cycles are separable by performance of real-time operations.

In this exemplary method, the digital data processing system includes a limited amount of memory, and performs real-time operations by sending messages to objects. An object is created when needed for a specific functionality of the real-time operations, and a portion of the limited amount of memory is assigned to each object as it is created. The objects are stored in memory in a time-ordered sequence and are either marked or unmarked. Advantageously, the steps of the method comprise determining a monotonically increasing condemned region of memory by selecting a first object as a beginning of the condemned region, the condemned region extending forward in time from the first object to any most recently defined object. Next, objects in the condemned region that are referenced from outside of the condemned region are marked. Objects within the condemned region that are referenced from objects within the condemned region are then marked. A last object is next determined as the end of the condemned region. Advantageously, stack objects are checked for references to objects within the condemned region after an end to the condemned region is determined. Finally, memory resources associated with unmarked objects within the condemned region are recovered for use in creating new objects.

In an exemplary embodiment of this invention, a method is disclosed for effecting recovery of memory resources in a digital data processing system performing real-time operations. The digital data processing system includes a limited amount of memory and performs real-time operations by sending messages to objects defined in the limited amount of memory. Each of the objects is created when needed for a specific functionality of the real-time operations, and may be either stack objects or non-stack objects and are either marked or unmarked. An object is referenced in this exemplary embodiment when at least one other object may send a message to that object. Objects are stored in memory in a time-ordered sequence grouped into a plurality of generations containing approximately contemporaneously created objects. Each generation has an associated remembered set containing references to objects in prior generations that reference objects within the generation.

A first phase selects a contiguous one or more of the plurality of generations as a dynamically growing condemned region by selecting a first generation from the plurality of generations as a beginning of the condemned region, wherein the condemned region extends forward in time from the first generation to any most recently defined generation. A second phase determines whether each generation contains a predetermined number of objects and, when a generation has less than the predetermined number of objects, compacts two or more adjacent generations. A third phase marks objects in the condemned region that are referenced by objects outside of the condemned region by traversing the remembered sets for each generation in the condemned region.

A fourth phase marks objects referenced from the previously marked objects within the condemned region by scanning each object from a first object in the first generation to any most recently created object. A determination is made whether each object is marked, and if one of the objects is marked, a determination is made whether the object references another object within the condemned region. If the object references another object within the condemned region, the referenced object is marked and the referenced object is placed on a SAVELIST for determining at a subsequent time, whether the marked object references another object within the condemned region. Also, a list is made of unmarked objects that have a LASTWILL flag set.

A fifth phase determines a last generation as an end of the condemned region. A sixth phase traverses all stack objects and marks all objects referenced from marked stack objects. A seventh phase reattaches unmarked objects on the LASTWILL list that would otherwise be recovered. An eighth phase recovers unreachable objects by sequentially examining each object in the condemned region for unmarked objects, and freeing the memory resources associated with unmarked objects. A complete duty cycle of this invention comprises 8 phases, wherein each phase comprises one or more cycles. Each cycle of each phase comprises one or more tasks, which are non-decomposable operations of the recovery process. Each pair of adjacent cycles are separable by performance of real-time operations, and each cycle is limited to a predefined time period.

DETAILED DESCRIPTION

This invention will be described in connection with a telephone switching system, but the application of this system is much broader. For example, a garbage collector according to this invention may be used in a general purpose program-controlled system that may or may not have real-time constraints, or in an air traffic control system, etc., that have real-time constraints.

This invention is pan of the Calico object-oriented program-controlled system, available from AT&T. Calico is described in the following documents: "A Dynamic C-Based Object-Oriented System for UNIX", *IEEE Software*, May, 1991, p.73–85; "Getting Started with the Calico System", published by AT&T; "Calico: An Object Oriented Programming Language and Environment", published by AT&T; and "The Calico Programming Language: Language Definition", published by AT&T.

Figure 1:
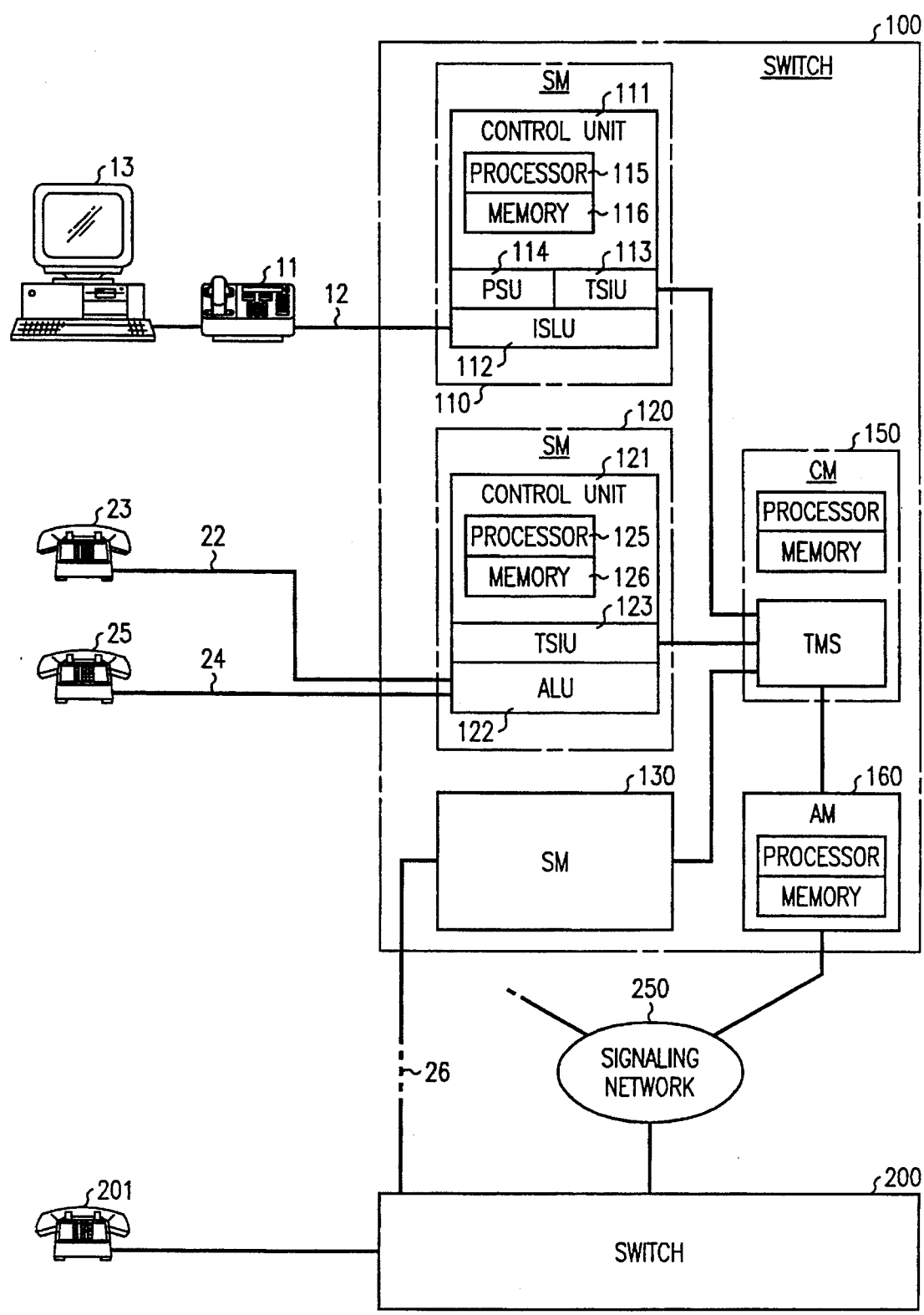
FIG. 1 illustrates an exemplary electronic telephone switching system controlled by an object-oriented call processing system employing a preferred embodiment of this invention.

An exemplary method for memory reclamation for systems with real-time constraints is described herein in the context of a telephone switching network configuration of FIG. 1 having two central office switches, 100 and 200, an interswitch signaling network 250, e.g., a common channel signaling (CCS7) network and illustrative communications stations, including conventional analog telephone station sets 23, 25 and 201, an integrated services digital network (ISDN) telephone station set 11, and data terminal 13.

Switches 100 and 200 are interconnected by a communication path 26, which may include intermediate switches.

Illustratively, switch 100 is a distributed control, ISDN electronic telephone switching system such as the system disclosed in the U.S. Pat. No. 4,592,048, issued to M. W. Beckner, et al., on May 27, 1986. Alternatively, switch 100 may be distributed control, analog or digital switch, such as a 5ESS® switch as described in the AT&T Technical Journal, v.64, No. 6, July/August 1985, pp 1303–1564, the November, 1981, Bell Laboratories Record, page 258, and the December, 1981, Bell Laboratories Record, page 290, and manufactured by AT&T.

An integrated services digital network (ISDN) is a network that provides end-to-end digital connectivity to support a wide range of services, including voice and non-voice services, to which users have access by a limited set of standard multipurpose customer interfaces. Switch 100 includes a number of switching modules (SMs), each associated with a different set of telephone station sets or trunks. Each switching module includes a control unit for controlling connections to and from its associated telephone station set or trunks. Switching module 110, for example, includes control unit 111 for controlling connections to and from telephone station set 11. Switching module 120 includes control unit 121 for controlling connections to and from telephone station set 23.

In the preferred embodiment of this invention, software functions which are typically written in procedural program-controlled systems, are written in an object-oriented program-controlled system which more directly describes the functionality of the underlying hardware and logical entities common to call processing. Advantageously, the burden of resource deallocation may be shifted to the object-oriented program-controlled system, thus eliminating a common source of error in procedural systems. To avoid undue delay in processing telephone calls, an object-oriented program-controlled system for switching applications is more real-time intensive than other object-oriented program-controlled systems.

Each control unit 111, 121 comprises a processor 115, 125 and memory 116, 126, respectively. In this embodiment, processors 115, 125 use memory 116, 126 to store objects and performs processing by sending signals in the form of messages to the objects stored in memory 116, 126.

The architecture of switch 100 includes communication module (CM) 150 as a hub with switching modules 110, 120, and 130, and an administrative module (AM) 160 emanating therefrom. Switching module 110 includes an integrated services line unit (ISLU) 112, which terminates the digital subscriber lines, e.g. 12, and provides access to a time slot interchange unit (TSIU) 113 and a packet switching unit (PSU) 114. TSIU unit 113 and PSU unit 114, respectively, provide circuit and packet switch connections to and from the associated telephone station set 11, under control of control unit 111.

Switching module 120 includes an analog line unit (ALU) 122 which terminates conventional analog lines (i.e., tip-ring pairs), 22, 24, and provides access to TSIU 123. TSIU 123 provides circuit-switched connections to and from the associated telephone station sets 23, 25 under control of control unit 121. Switching module 130 is similar to switching modules 110 and 120, but includes the appropriate analog or digital trunk unit (not shown) for interfacing with the outgoing trunk included in communication path 26 to switch 200.

ISDN telephone station set 11 communicates with switch 100 in two 64 kilobits per second channels, referred to as B-channels, and in one 16 kilobits per second, referred to as a D-channel. Each of the B-channels is usable to convey digitized voice samples at the rate of 8000 8-bit samples per second or data at a rate of 64 kilobits per second. The D-channel is used both to convey signaling packets to effect message signaling between ISDN stations and switching module control unit and to convey data packets between different ISDN stations.

Information is conveyed between ISDN telephone station set 11 and switch 100 using a 4-wire digital subscriber line (DSL) 12, using one pair of wires for each direction of transmission. DSL 12 transmits a serial bit stream at the rate of 192 kilobits per second, which comprises 144 kilobits per second, the above-mentioned two 64 kilobits per second B-channel and one 16 kilobits per second D-channel, and which further comprises 48 kilobits per second used for a number of functions, including framing, DC balancing, control and maintenance. DSL 12 represents what is referred to by International Telegraph and Telephone Consultative Committee (CCITT) as the T-interface. The use of the T-interface is only exemplary, however, as the invention is equally applicable to systems using other access methods. Signaling packets are conveyed between ISDN stations and the switching module control units enclosed in level 2 (link-level) frames, for example, in accordance with the standard link access protocol D (LAPD). The exemplary signaling message used for the control of circuit-switched calls are in accordance with CCITT recommendation Q.931.

Communications module 150 includes a time-shared space-division switch or time-multiplexed switch that provides 64 kilobits per second circuit switched paths between switching modules. It supports B-channel traffic between switching modules as well as packet traffic between PSUs in different switching modules. The switching module control unit provides call processing and overall control in maintenance functions for the switching module. Switching module control units in different switching modules communicate with others and with the administrative module 163 message switch (not shown) in communications module 150, using an internal message protocol. This architecture provides flexibility in placing specific processing functions in specific processing elements.

Communication module 150 comprises a time multiplexed switch (TMS) as a switch fabric for communication among switch modules and the administrative module. The TMS is controlled by a processor and memory. The processor of CM 150 uses memory in a similar fashion to the switch module, that is, the processor stores objects in memory to represent data, and sends messages to those objects in order to control the connectivity through the TMS. Administration module 160 may also be controlled by an object-oriented system, with a processor and memory, as above.

To complete the description of FIG. 1, switch 200 is shown connected to a conventional analog telephone station set 201, for purposes of illustration. The architecture of switch 200 and the types of telephone station set served by switch 200 are not important to the present invention and are thus not described further.

Common to all electronic telephone switching systems is the notion of a transient call state. Current implementations (both object-oriented and procedural) directly allocate and recover resources associated with these states. Because of the preferred embodiment of this invention described below, programming may be simplified as the garbage collector, according to this invention, recovers all unreachable objects and provides for recovering non-memory resources.

Figure 2:
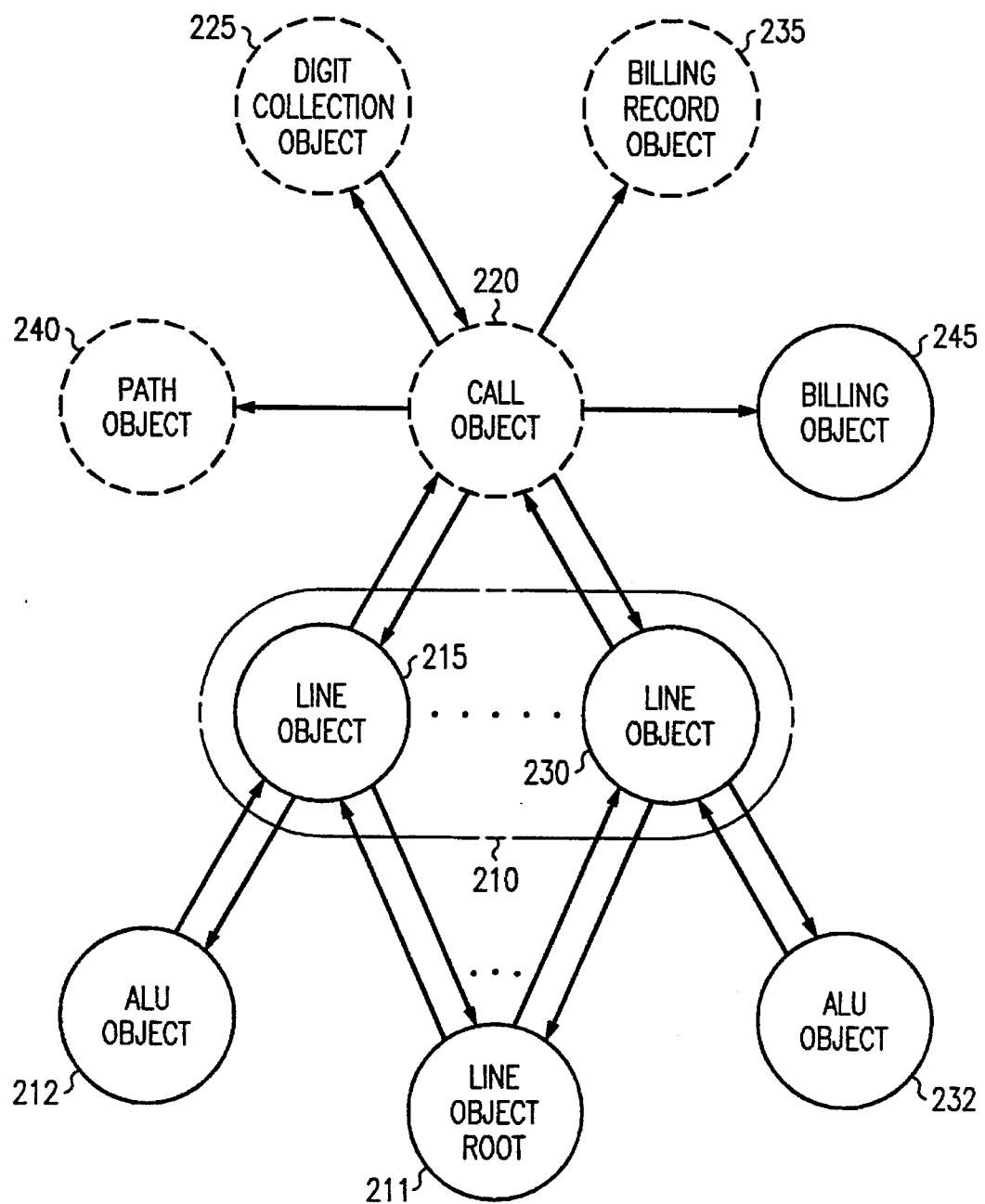
FIG. 2 illustrates a diagram of call objects during a typical call in the electronic telephone switching system of FIG. 1.

Turning now to FIG. 2, an object-oriented call processing scenario is shown in simplified form, as would take place in the electronic telephone switching system of FIG. 1. Each unit in the switch 100 of FIG. 1 is represented by an object in an object-oriented implementation. For example, each line connected to switch module 121 has an associated line object from the set of line objects 210. All line objects are permanent objects in this embodiment, associated with a "root" line object 211. Alternatively, each line object 210 may be a root object. Each object associated with a unit or device is created when the unit is provisioned, as is known in the art.

Permanent (or long-lived) objects, such as line objects 210 are represented by solid circles in FIG. 2. When an object contains a reference to another object, such that the object may send a message to the other object, the reference or message path is represented by an arrow. Temporary objects, such as object 220, created for a short period of time, are represented by phantom circles.

The illustrative call is an intramodule call within SM 120 of switch 100, between telephone 23 and telephone 25. This description also applies to an intermodule call, for example, between telephone 23 and telephone 11, or a network call between telephone 23 on switch 100, and telephone 201 on switch 200, for example. For a more detailed description of object-oriented call processing, see E. C. Arnold and D. W. Brown, "Object Oriented Software Technologies Applied to Switching System Architectures and Software Development Processes," Proceedings, XIII International Switching Symposium, Vol. II, pp. 97–106.

In the illustrative call scenario of FIG. 2, a call is initiated by the user of telephone station set 23 (FIG. 1), by taking the receiver offhook. An object associated with offhook detection in ALU 122 (FIG. 1), ALU object 212, sends an offhook message to a line object 215 which represents the current state of telephone 23. Line object 215 reacts to the offhook message by causing a call object 220 to be created and storing a reference to the call object. Call object 220 also stores a reference to line object 215, as illustrated by the arrows connecting objects 215 and 220. Call object 220, as part of processing in response to the message from line object 215, causes a digit collection object 225 to be created. Also during processing, call object 220 causes a billing record object 235 to be created. Billing record object 235 records timing and destination information regarding a particular call. Alternatively, digit collection object 225 and billing record object 235 may be created as part of the creation of call object 220.

Messages are sent to the digit collection object 225 as digits are received at ALU 122 (FIG. 1) through ALU object 212 and line object 215. In response to receiving digits, digit collection object 225 analyzes the received digits in light of the office or telephone dialing plan as known in the art. The dialing plan may be a separate object or may be part of each digit collection object. Alternatively, a reference to digit collection object 225 may be established in ALU object 212 directly, bypassing line object 215 and call object 220, and thus taking advantage of the nature of an object-oriented program-controlled system.

The result of digit analysis from the digit collection object 225 is sent via message to call object 220. In this example, a directory number for telephone 25 was dialed. Digit collection object 225 recognizes that the call is for telephone 25 and performs the directory number to line translation, as is known in the art. In response to the digit analysis message, the call object 220 deletes its reference to digit collection object 225. Because the reference from call object 220 was the only reference to the digit collection object 225, the digit collection object is now considered "garbage" and may be recovered by the garbage collector. As a further response to the message from the digit collection object 225 to call object 220, call object 220 sends a message to line object 230 which represents analog telephone station set 25 (FIG. 1). Line object 230 notified ALU object 232 of the incoming call. ALU object 232 causes audible ringing to be applied to telephone station set 25. In response, the user of telephone station set 25 takes the receiver off-hook causing an off-hook message to be sent by ALU object 232 to line object 230, and then to call object 220.

In order to complete the call between telephone station sets 23 and 25, call object 220 causes the creation of a path object 240, which controls the network in switch module 210 to physically link the paths of telephone station set 23 to telephone station set 25 through ALU 122 and TSIU 123, as is known in the art and further described in Arnold et al. At this point the call between telephone station set 23 and 25 is in a stable state.

At some later time, telephone station set 25 goes onhook, stimulating an onhook message sent from ALU object 232 to line object 230. An onhook message is then sent from line object 230 to call object 220, and line object 230 deletes its reference to call object 220. In response to the onhook message, call object 220 sends a tear-down message to path object 240 to disconnect telephone station sets 23 and 25. Further, call object 220 sends an onhook message to line object 215, which then deletes its reference to call object 220, making all objects illustrated in phantom circles unreachable, and hence recoverable.

In this embodiment of this invention, call object 220 may have, for example, an indication that it has non-memory resources connected to it which need to be recovered. In this embodiment of this invention, this indication is called a LASTWILL flag, as will be described further in connection with FIG. 13. Eventually, when call object 220 is recovered, it will be sent a special message called a "finalize" message. In response to the finalize message, call object 220 delivers a reference to billing object 235 to permanent billing object 245. Billing object 245 is an object reachable from a root object which keeps a permanent record of billing for a particular line. Since call object 220 has no further work to do, call object 220 may now be recovered. Billing object 245 makes a permanent record of billing record object 235 and then deletes reference to billing record object 235. Billing record object 235 may now be recovered.

Figure 3:
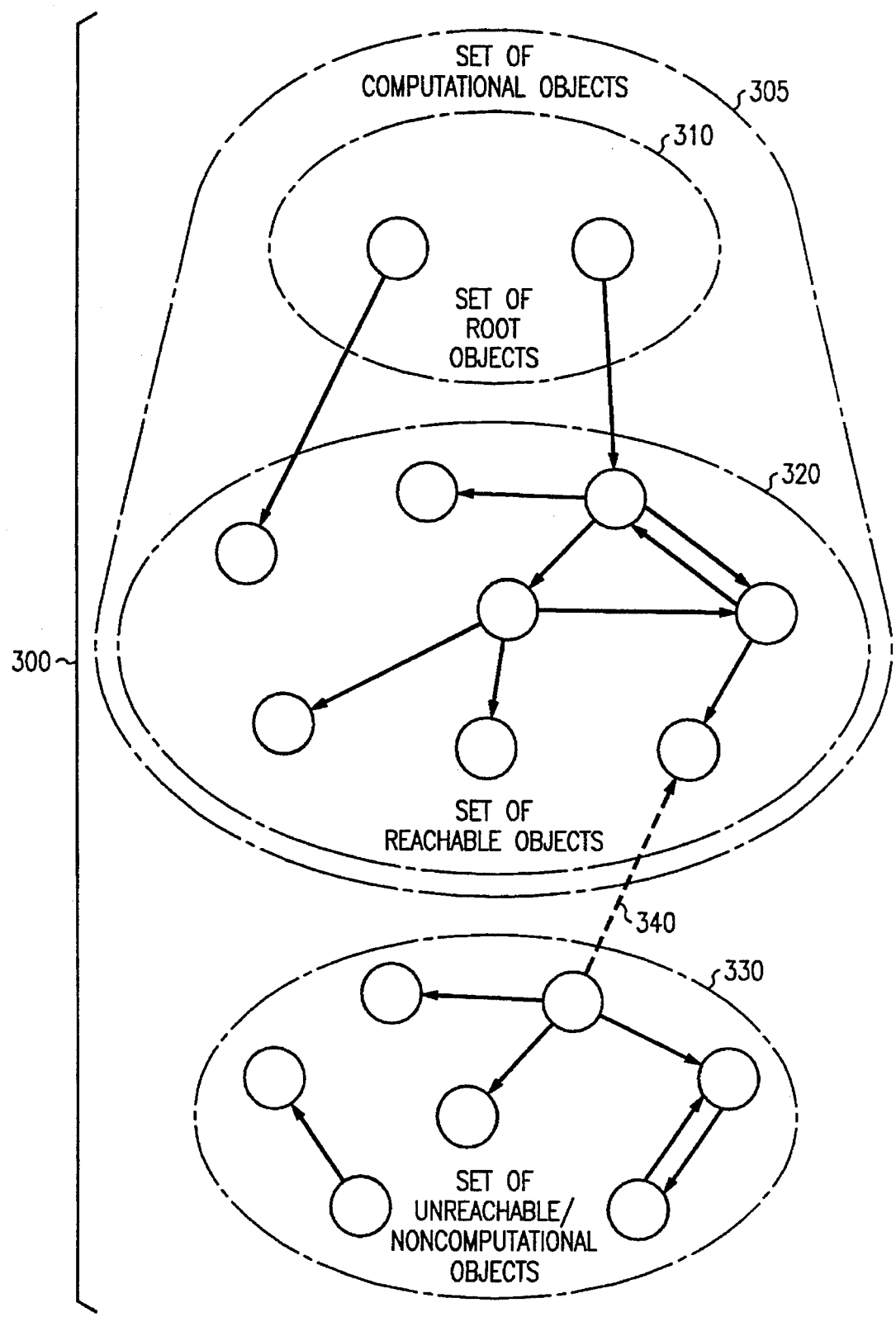
FIG. 3 illustrates the universe of objects after the call scenario of FIG. 2 illustrating a set of reachable objects, i.e., reachable from a set of root objects, and a set of unreachable objects.

FIG. 3 is a Venn diagram 300 of objects in the object-oriented program-controlled system of FIG. 2 after the termination of the phone call. After termination of the phone call, there exists in memory a set of computational objects 305 and a set of non-computational objects 330. The set of computational objects 305 includes a set of root objects 310, which are permanent in the system and are the objects from which computation begins. An example of a root object is line object root 211. The set of computational objects 305 also includes a set of reachable objects 320. Reachable objects 320 comprise objects referenced by root objects, and all objects referenced by other reachable objects. These objects may be, for example, line objects 210 and billing objects, such as billing object 245.

The set of non-computational and, by definition, unreachable objects 330 comprise objects that are no longer used in processing, such as call object 220, billing record object 235, digit collection object 225, and path object 240. Unreachable objects 330 may include references to reachable objects, as illustrated by phantom line 340, but since the objects in this set are not reachable, this linkage does not matter. However, all of the data stored in the set of unreachable objects 330 is still retained in memory. Therefore, a garbage collector must remove the objects to provide memory space for objects used in other calls.

The set of reachable objects and the set of unreachable objects are dynamically changing as new objects are created and as object references change. As objects are created, they can be added to the set of reachable objects by having a reference to the object pushed onto a process stack object, thus creating a reference to the new object from a reachable stack object. Object references change during system processing as a result of assignment. Assignment either leaves the sets of reachable and unreachable objects unchanged, or it may subtract a subset of objects from the set of reachable objects and add these objects to the set of unreachable objects. Furthermore, an object may become unreachable because it was only referenced from a stack, and the stack reference was "popped" when the stack shrank.

In an operating system using the preferred embodiment of this invention, assignments are trapped. Assignments are trapped for two reasons. First, this avoids race conditions between the garbage collector and system processing in locating referenced objects. Race conditions can occur as object references are moved from areas that have not been examined by the garbage collector to ones that have been examined. Second, assignment trapping records references from older objects to younger objects in remembered sets, thus taking advantage of Hewitt/Lieberman's second observation. Assignment trapping will be discussed in more detail below. As an optimization, stack assignments, which occur frequently, are not trapped but are accounted for through a special process, also described below, in connection with phase 6 of the exemplary embodiment of this invention.

A simple extrapolation from one call to several thousand in the example of FIG. 3, as is typical in a switch module, shows that in a call processing system, resource allocations take place continually and resources are freed, i.e., become unreachable, at a similar rate. Therefore, if resource deallocation is to occur automatically, it must deallocate at a rate proportionate to resource allocation. To this end, the garbage collector, according to this illustrative embodiment, runs as part of the allocation process every N occurrences of allocation of memory for new objects. N, in the preferred embodiment, is a variable called the "cycle steal interval," which can be adjusted according to conditions in the system. Adjustment of the cycle steal interval depends on whether the garbage collector makes forward progress during each invocation, as will be discussed in more detail below.

Additionally, a garbage collector cannot cause undue delay in system processing by locking the system while it runs. The garbage collector according to the preferred embodiment of this invention uses a hierarchy of functionality to provide a framework in which the garbage collector may take real-time breaks but still operate efficiently. To this end, this garbage collector continuously runs in a duty cycle, which cycles through eight internal phases. When a duty cycle is completed, the garbage collector starts over again with another duty cycle. A duty cycle selects a set of generations to search for unreachable objects and reclaims memory and nonmemory resources associated with all such objects found.

Each phase in a duty cycle accomplishes a specific function and takes one or more real-time segments to complete. A phase comprises one or more cycles, each of which is an individual real-time segment in which the garbage collector performs work. A cycle comprises one or more discrete "tasks." A task is an indivisible portion of the garbage collector's work. Each task must complete within one cycle, and tasks are defined so that a cycle may terminate following the completion of any task. The number of tasks in a cycle is run-time dependent. Each task is assigned a weight factor dependent upon the time taken to perform its function, as empirically determined off-line. A cycle has a number or value representing the amount of time in the garbage collector's real-time segment. As the cycle progresses, the weights of the tasks performed during the cycle are added and compared to the value of the real-time segment. If the value of the real-time segment is greater than the added weights, then the next task's weight is compared to the remainder. If the next task's weight is less than or equal to the remainder, then the next task is run. If the next task's weight is greater, then the cycle stops. The overhead of performing these computations are also given a weight and accounted for in each cycle.

In the preferred embodiment, each cycle satisfies two criteria:

1. The cycle completes within bounded time (for example, for purposes of this embodiment, less than 10 ms)
2. The phase has made forward progress toward completion during the cycle.

The first criterion guarantees that application processing will not be interrupted for more than a small amount of real time by the memory reclamation process.

The second criterion (making forward progress) is aimed at deallocating objects at a rate that exceeds the rate at which objects are created. Furthermore, each phase must progress at a rate in which the amount of work that the phase must do to complete is decreasing at a reasonable rate. Each phase of the garbage collector of the preferred embodiment has an established evaluation criterion for determining when forward progress is not being made, which will be discussed in more detail in connection with the description of each phase.

Figure 4:
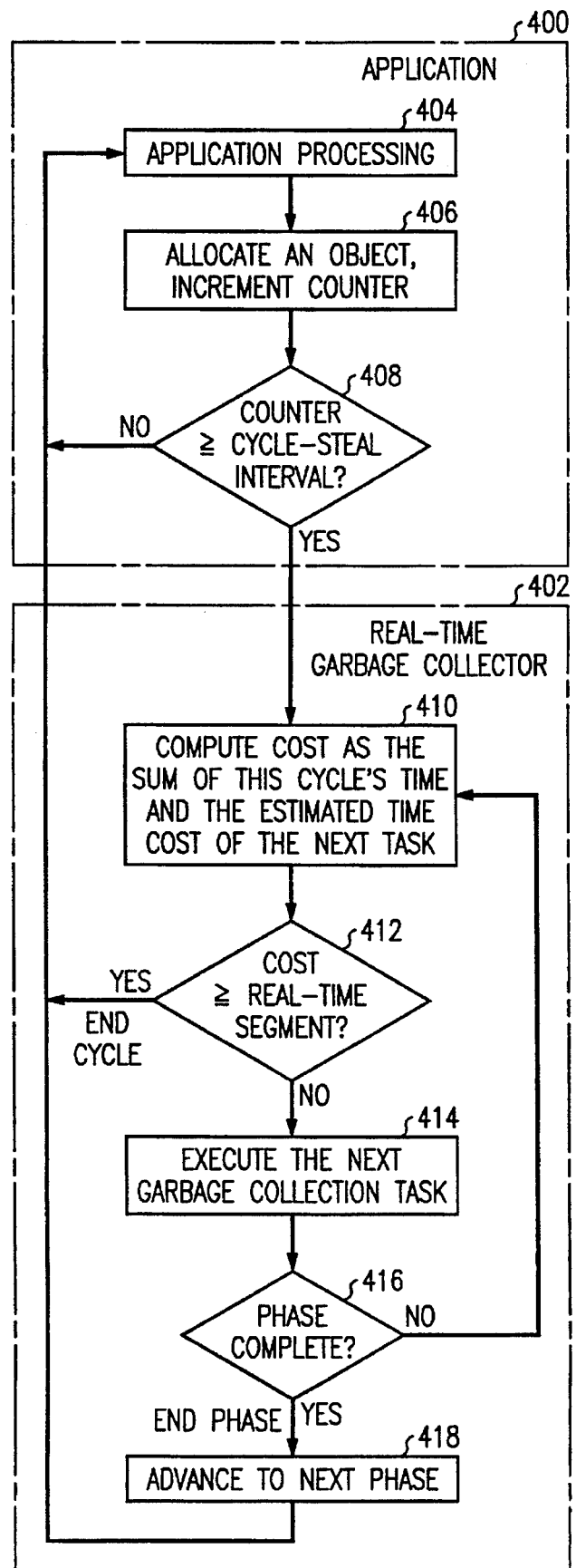
FIG. 4 illustrates the flowchart of real-time processing according to an exemplary embodiment of this invention.

FIG. 4 is a flow chart of the interactive operation between application processing and the real-time garbage collector, according to the exemplary embodiment of this invention. As explained above, this real-time garbage collector, performs one or more tasks and then returns processing back to application processing. FIG. 4 illustrates such processing in application box 400 and real-time garbage collection box 402. Application processing occurs in application box 400 in action box 404. As part of application processing in box 404, objects are allocated. Processing proceeds to action box 406 where, when an object is allocated, a counter is incremented. Processing continues to decision diamond 408 where a determination is made whether the counter is greater than or equal to the cycle-steal interval. As defined, above, the cycle-steal interval is the number of objects that can be allocated before garbage collection should occur so that garbage collection does not lag behind object allocation (which could cause application processing to run out of memory). If, in decision diamond 408, the counter is not less than or equal to the cycle-steal interval, then processing proceeds back to action box 404, application processing.

If the counter is greater than or equal to the cycle-steal interval in decision diamond 408, then processing proceeds to real-time garbage collection box 402. In the real-time garbage collection box 402, processing first moves to action box 410, where the cost of the next task is computed. The cost is the sum of any previous task's run time since entering box 402 and the estimated run time of the next task. If no previous task has run, as when a new cycle is starting, then the previous task's cost is zero, and the cost is the estimated time of the next task. The estimated times are the product of empirically determined time measurements for a single loop within the task times the predicted number of such task loops to complete the task.

Processing proceeds to decision diamond 412 where a determination is made if the cost determined in box 410 is greater than or equal to the real-time segment allocated. If the cost is greater than or equal to the time segment, then the garbage collector has performed as many tasks as can be accomplished during a real-time cycle and processing proceeds back to application box 400 and application processing action box 404.

If the cost is not greater than or equal to a real-time cycle, as determined in decision diamond 412, then processing continues to action box 414 where the next garbage collection task is performed. Each task of the garbage collection is one short, uninterruptible operation of the recovery process. Each task is defined below in connection with the phase in which it operates.

Processing continues to decision diamond 416 where a determination is made if a particular phase is complete. If the phase is not complete, then processing returns to action box 410 where the cost of the next task is computed.

If, in decision diamond 416, the phase is complete, then processing continues to action box 418 where the phase number is set equal to the next phase and processing returns back to the application in box 400 at application processing action box 404.

The eight phases of the preferred embodiment of the garbage collector according to our invention comprise:

1. Condemned region selection.
2. Generation data structure compaction.
3. Remembered set scan.
4. Condemned region scan.
5. Mark end of condemned region.
6. Process stack scan.
7. Lastwill processing.
8. Garbage reclamation.

Each phase will be discussed sequentially. The basic tasks will then be listed for each phase and the definition of forward progress will then be given for each phase.

FIG. 5 is a flow chart of the overall operation of a garbage collector according to the exemplary embodiment of this invention. This exemplary embodiment requires that, as objects are allocated, they are grouped into small, fixed-sized sets called "generations." Generations are temporally ordered such that generation X<generation Y ("younger than") if and only if every object within generation X was allocated after every object within generation Y. The constant "bgnGen" refers to the oldest generation which can be condemned. The variable "curGen" identifies the generation currently being filled by allocation of objects. bgnGen<= curGen. During allocation of objects, assignments are trapped such that an assignment of a reference to an object in a younger generation from an object in an older generation causes the object's reference to be appended to a data structure associated with the younger generation, called a "remembered set".

Figure 5A:
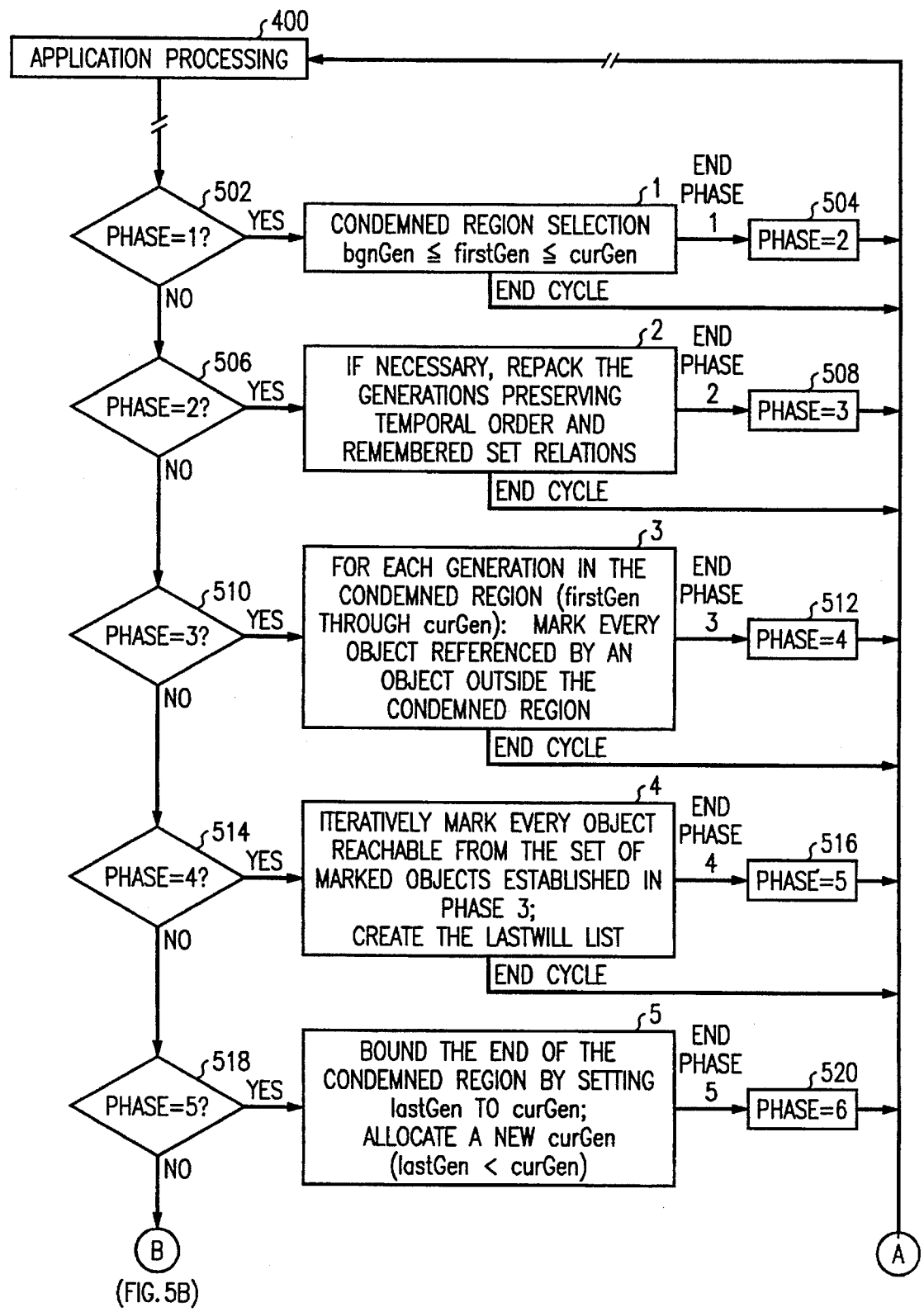
FIG. 5A and B illustrate a flow chart of processing according to an exemplary embodiment of this invention.
Figure 5B:
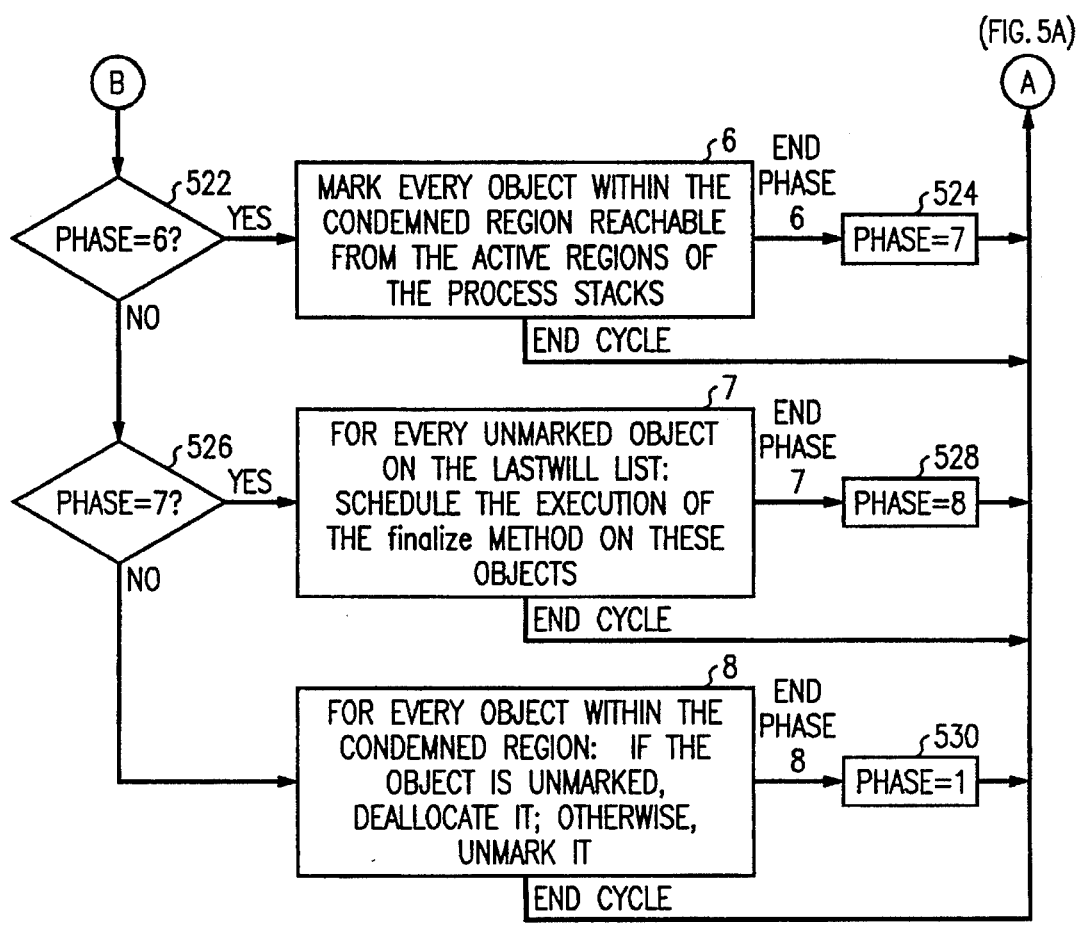

Turning now to FIGS. 5A and B, each box represents one phase of the preferred embodiment of the garbage collector as outlined above. As processing moves to garbage collection from application processing 400 (FIG. 4), a determination is made, in decision diamond 502 (FIG. 5A) whether the phase number is 1. If it is, then processing proceeds to box 1. Box 1 describes condemned region selection, where "firstGen" (the beginning of the condemned region) is selected. The first generation of the condemned region is usually older than or equal to the current generation in the relationship bgnGenL<=firstGenL<=curGen.

As each task of this phase is completed, a determination is made whether the next task may be performed, as set forth in the flow chart of FIG. 4. If an end of cycle is encountered (time of next task, plus time of previously run task(s) is greater than the cycle-steal rate, as illustrated in FIG. 4, boxes 410 and 412), then processing is illustrated as exiting box 1 at the bottom and returning to application processing 400. The next time the garbage collector runs, the phase is still equal to 1, and this phase will run again. Eventually, the phase is completed, and processing proceeds to box 504, where the phase is changed to "2."

If the phase number equals 2 in decision diamond 506, processing moves to phase 2 processing in box 2. In box 2 (generation data structure compaction), if a sufficient number of deallocations of objects has occurred, the generation sets (information that is stored regarding generation structured are sparsely filled and are combinable with other generations. The generations are then repacked, preserving the temporal order of the objects and the remembered set relations for objects that are moved during repacking from one generation to another. The firstGen and curGen assignments may be updated as a consequence of repacking but the firstGen<=curGen relationship is preserved. As above, when a cycle completes, processing is illustrated as exiting this box from the bottom, and the phase will run again. When the phase is complete, processing exits through box 508 where the phase number is set to 3.

If the phase number equals 3 in decision diamond 510, then processing proceeds to box 3 (remembered set scan). In the remembered set scan, for each generation in the condemned region, every object within those generations referenced by an object outside of the condemned region is marked. When a cycle completes, processing is illustrated as exiting this box from the bottom and the phase will run again. When this phase is complete, processing exits through box 512 where the phase number is set to 4.

If the phase number equals 4 in decision diamond 514, then processing proceeds to box 4. In box 4, condemned region scan, the condemned region is iteratively scanned for objects marked during processing represented by box 3. Every object referenced by a marked object within the firstGen through the curGen (the condemned region) is marked. Also, all objects that are marked as having a "lastwill" method are put on a lastwill list, which is used in the seventh phase. As above, when a cycle is completed, processing is illustrated as exiting this box from the bottom, and the phase will run again. When the phase is complete, processing exits through box 508 where the phase number is set to 5.

If the phase number equals 5 in decision diamond 518, processing then proceeds to box 5, where the end of the condemned region is determined. Here, lastGen (last generation in the condemned region) is set to curGen (the current generation being filled with objects being allocated) and a new generation is started. Unlike the other phases, this phase is always only one cycle long. Therefore, processing exits through box 508 where the phase number is set to 6.

If the phase number equals 6 (FIG. 5B) in decision diamond 522, then processing proceeds to box 6. Box 6 is the process stack scan, where the process stacks are scanned for references to objects in the condemned region. The referenced objects are marked. These referenced objects are also checked for indirect references to other objects, and these objects are also marked. As above, when a cycle is completed, processing is illustrated as exiting this box from the bottom, and the phase will run again. When the phase is complete, processing exits through box 508 where the phase number is set to 7.

If, in decision diamond 526, the phase number equals 7, processing then proceeds to box 7 (lastwill processing). In lastwill processing, as will be explained further, below, certain objects control system resources that need to be freed for reuse before the object referencing the resource can be deallocated. Unmarked objects on the lastwill list are processed, by causing their finalize method to run, which generally frees the system resources. The finalize method is scheduled to be run during application processing (box 400). As above, when a cycle is completed, processing is illustrated as exiting this box from the bottom, and the phase will run again. When the phase is complete, processing exits through box 508 where the phase number is set to 8.

Processing next proceeds to box 8, garbage reclamation. In box 8, every object in the condemned region is sequentially scanned. If the object is unmarked, then it is not reachable and is deallocated. If the object is marked, then it is unmarked. After the phase completes, the phase number is set to 1 in box 530. Processing then loops back to application processing 400.

Figure 6:
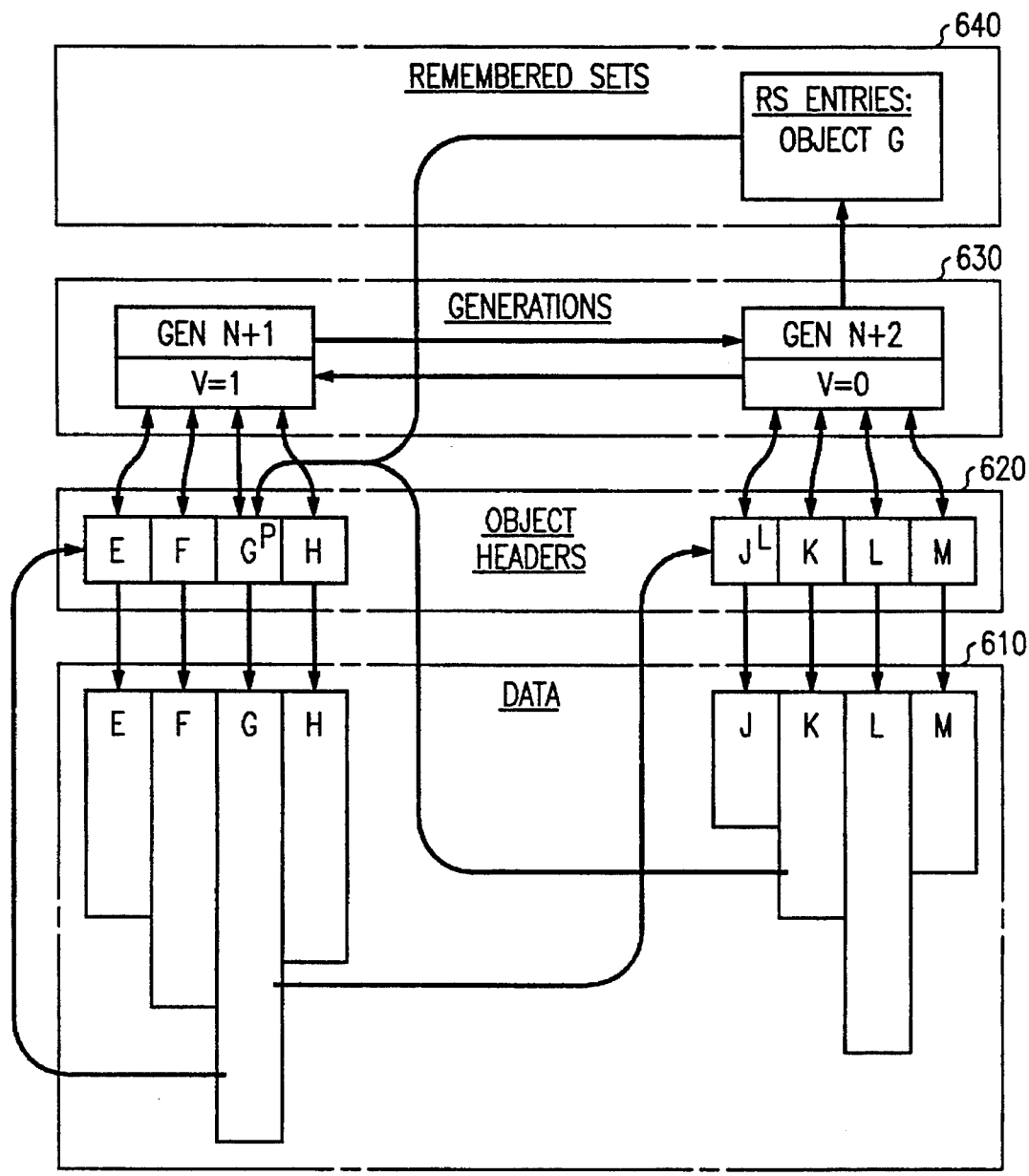
FIG. 6 illustrates a block diagram of the objects and organizational headers of the sets of objects.

FIG. 6 illustrates a block diagram of a small set of objects in memory, as would be found, for example, after the call scenario of FIG. 2, as reflected in the Venn diagram of FIG. 3. A plurality of data portions of objects are shown at 610. Each object contains reference and non-reference data. References in an object data to other objects are represented by the arrows. For example, object K references object G, and object G references objects E and J. Each object occupies a predetermined amount of memory with some objects larger than others. While in the example of FIG. 6 objects data 610 are substantially contiguous, in an operational system the objects may not be contiguous and may be widely scattered throughout memory.

In the preferred embodiment, a plurality of object headers are contained in memory, as illustrated at 420. For each object of 410, there is a corresponding object header 620, which describes characteristics of each object of 610. These characteristics are used during processing and during garbage collection. Object headers 620 include the data in Table 1, in the preferred embodiment.

Table 1 pointer to object data
pointer to class definition object
content category
LASTWILL flag
garbage collector SAVELIST flag
garbage collector MARKING flag
size of data in object
pointer to generation The first field locates the object's data in memory, and is used by both processing and the garbage collector. The pointer to class definition object refers to the class description object that describes all instances of the object's class. This is an object reference that is treated as a special case, as will be described below. The class description object contains information on the layout of the object data which is used by the garbage collector to distinguish object references within the object's data from primitive data items in the object's data, and from other information which is not relevant to this invention. The content category field governs how object references are found within object data. This field indicates whether the object contains no object references, only object references, or some mixture of object references and primitive data items. The LASTWILL flag, if set, indicates that the object provides a finalize method which is to be invoked when the object is no longer referenced, as will be discussed below in connection with FIGS. 10–13, and 15. The MARKING flag is used to mark an object as referenced by the garbage collector, and will be described below in connection with FIGS. 10–13. The SAVELIST flag indicates whether an object is currently on the garbage collector's SAVELIST. The size field states the size of the object's data. The pointer to generation field connects the object header to the generation data structure containing this object.

The preferred embodiment of applicants' garbage collector also employs the concept of generations and remembered sets. In this illustrative embodiment, objects are grouped into roughly contemporaneous generations as they are created. A data structure is used to identify the objects in the generation, and the generation itself. Two generations are shown in FIG. 6 at 630. In this illustrative embodiment, there are generations N+1 and N+2, each having four objects. In practice, there would be many more generations and objects. Generations are numbered consecutively from a root generation containing root objects to the most recently created generation (N+2 in the example of FIG. 6). Each generation 630 is defined by a data structure of the type represented by Table 2.

Table 2 generation number;
version;
pointer to remembered set;
pointer to next generation;
pointer to previous generation;
count;
array of object pointers;

The first field is the generation number. The smaller the generation number, the older the generation is, and the root generation is, in the preferred embodiment, generation 1. The version field indicates how often this generation has been scanned for unreachable objects. The pointer to remembered set field connects the generation to the remembered set information associated with the generation. The pointer to next generation and pointer to previous generation fields link all generations on a doubly-linked list. "Count" is the number of active objects within the generation and the array of object pointers is an array whose elements point to each object header within the generation.

Assignment Trapping

Since a goal of the garbage collector, according to the preferred embodiment of this invention, is to perform its tasks in discrete, real-time bounded segments, other operations of the system occur while the garbage collector is running. The most significant impact of any other process is the assignment process, which creates references from one object to another.

Assignment while the garbage collector is running may affect the garbage collector process in two ways. First, it may remove objects from the set of reachable objects by assigning over existing object references. Second, it may move an object reference from an area not yet scanned by the garbage collector into an area already scanned. The first case, where reachable objects become unreachable, can be ignored. Such objects may not be reclaimed during the current duty cycle, but will be reclaimed the next time the generation is condemned. However, all objects whose references move during a duty cycle must not be missed by the garbage collector, to avoid a race condition between the garbage collector and system processing that could cause reachable objects to be deallocated.

Therefore, the garbage collector, according to the exemplary embodiment of this invention, requires that all non-stack assignments are trapped. Two types of action may need to be taken at every assignment. First, if the referenced object is in a younger generation than the referencing object, then a remembered set entry must be added to the generation of the referenced object. This check needs to be made regardless of the phase of the garbage collector. Second, if the referenced object is within the condemned region and is currently not marked as referenced then it may need to be saved depending on the current state of the garbage collector process. The actions taken by phase are as follows:

Condemned Region Selection—None.
Generation Data Structure Compaction—None.
Remembered Set Scan—If the referenced object is in the condemned area and the referencing object is older than the condemned region then mark the referenced object as referenced.
Condemned Region Scan—If the referenced object is in the condemned area and the referencing object is older than the condemned region or the referencing object is marked as referenced within the condemned area then mark the referenced object as referenced. If the referenced object was marked and it is not in a generation younger than the current generation being scanned then add the referenced object to the SAVELIST.
Mark End of Condemned Region—If the referenced object is in the condemned region and the referencing object is older than the condemned region or the referencing object is marked as referenced within the condemned region, then the referenced object is marked as referenced, and added to the SAVELIST.
Process Stack Scan—If the referenced object is in the condemned area then mark it as referenced and add it to the SAVELIST.
Lastwill Processing—None (all reachable objects have been marked).
Garbage Reclamation—None.
SAVELIST processing will be described below.

As described above in the Background of the Invention, relatively few objects reference younger objects. Therefore, the preferred embodiment of this invention advantageously uses remember sets 640 associated with selected generations. Empirically, approximately 80% of generations contain objects with references from prior generations, and therefore an additional savings is realized in the preferred embodiment by having remembered sets for only the generations that contain objects referenced by objects in prior generations.

As shown in FIG. 6, generation N+2 has an associated remembered set. Generation N+1, for purposes of illustration, does not have objects referenced from objects in prior generations and, therefore, does not have an associated remembered set. In actual practice, generation N+1 would have at least one reference from an object in a root generation, or would be a root generation. Each remembered set is an array of structures as shown in Table 3. As references are created from older to younger objects, entries comprising data structures of Table 3 are added to the remembered set array.

Table 3 next remembered set entry
object
offset into objects data

Table 3 shows a representative structure for a remembered set entry. The first field points to the next remembered set entry. The object field points to the object from an older generation that may contain a reference to an object within this generation. The offset field gives the location within the object's data area where the reference was once assigned. There is one exception: if the object from the older generation is referenced from the pointer to class definition field (Table 1) the offset field contains a distinctive value (−1 in the preferred embodiment).

The assignment trap that creates a remembered set entry does not purge earlier entries made; therefore, when new assignments are made to the same reference location in an object's data, some of the entries stored in the remembered set may no longer be valid. No effort is made to remove these invalid entries during assignment, because the effort required would exceed the benefits gained.

Generations and objects within the generations are drawn contiguously in memory in FIG. 6 and subsequent figures to facilitate understanding and the description of this invention. It is to be understood that neither generations nor objects are necessarily contiguous in memory. Additionally, in the preferred embodiment of this invention, a sequence of N generational data structures represents a logical generation wherein N is a selectable parameter. Only one generation will be shown in this embodiment for clarity. Additionally, each generation contains, at most, references to 64 objects, in the preferred embodiment.

Phase 1—Condemned Generation Selection

Figure 7:
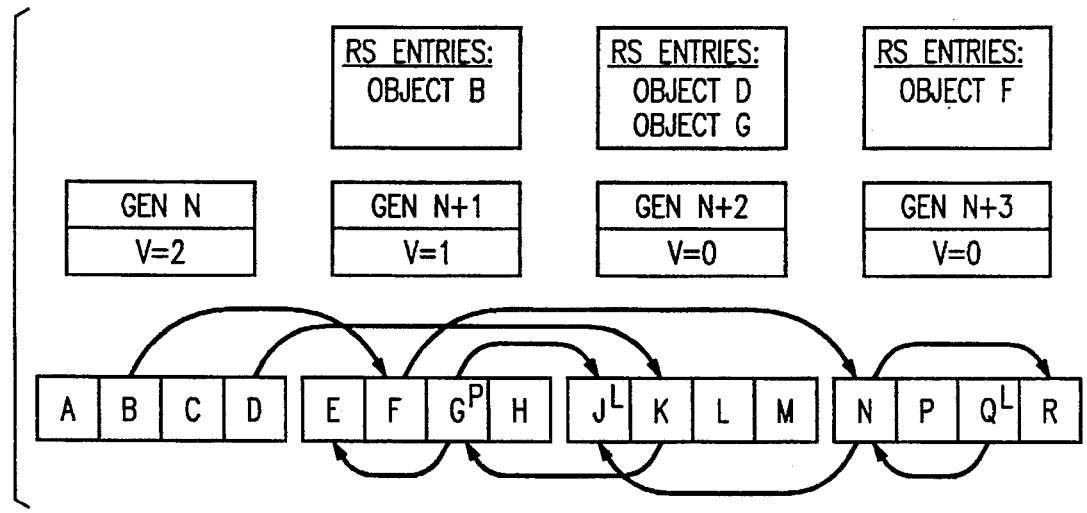
FIG. 7 illustrates a simplified block diagram of FIG. 4, in the context of a larger operational system that could benefit from garbage collections, prior to operation of the preferred embodiment of this invention.

FIG. 7 is an expanded illustration of the memory map of FIG. 6, which will be used to describe the phases of the garbage collector of the exemplary method of this invention. In FIG. 7, there are four generations, N, N+1, N+2 and N+3, each comprising four objects. Generations N+1, N+2 and N+all have a remembered set (RS) array of objects that point into the generation from prior objects. Object header and object data are illustrated in this figure as one logical block.

Each generation includes a version number, as illustrated in Table 2, which indicates how many times the generation has been "condemned," or scanned for unreachable objects. The higher the version number, the more often the generation has been scanned. Accordingly, the garbage collector selects a version number, and designates all generations that have a version number equal to or less than the selected version number as the condemned region.

In this illustrative embodiment, the garbage collector keeps a count of how many times the duty cycle has completed. This counter is compared to a table and a determination is made as to which generations to condemn. In the preferred embodiment, generations with a version number of zero are the most frequently condemned. Generations with a version number of one or less are condemned approximately every 4 duty cycles. Every 32 duty cycles generations with version numbers of 5 or less are condemned; and every 128 duty cycles generations with version number of 10 or less are condemned. Finally, every 1024 duty cycles all generations except for the root generation are condemned, and the count of duty cycles is set to zero.

Alternatively, the version number of the generations for the condemned region could be selected on the basis of heuristics or any other function that provides a reasonable rate of recovered resources while periodically condemning the entire system in order to find longer lived objects which have become unreachable.

Also during this phase, the garbage collector selects its initial "cycle steal" interval. The cycle steal interval is the number of object allocations between real-time segments of the garbage collector. The larger the condemned region, the smaller the cycle steal interval, so that the garbage collector will run more frequently. The cycle steal interval may be adjusted dynamically, based upon whether the garbage collector is making too little or too much forward progress. For the preferred embodiment, the initial cycle steal interval is between 8 and 1024 allocations between cycles. In the preferred embodiment, the garbage collector also runs cycles while the system is idle.

Figure 8:
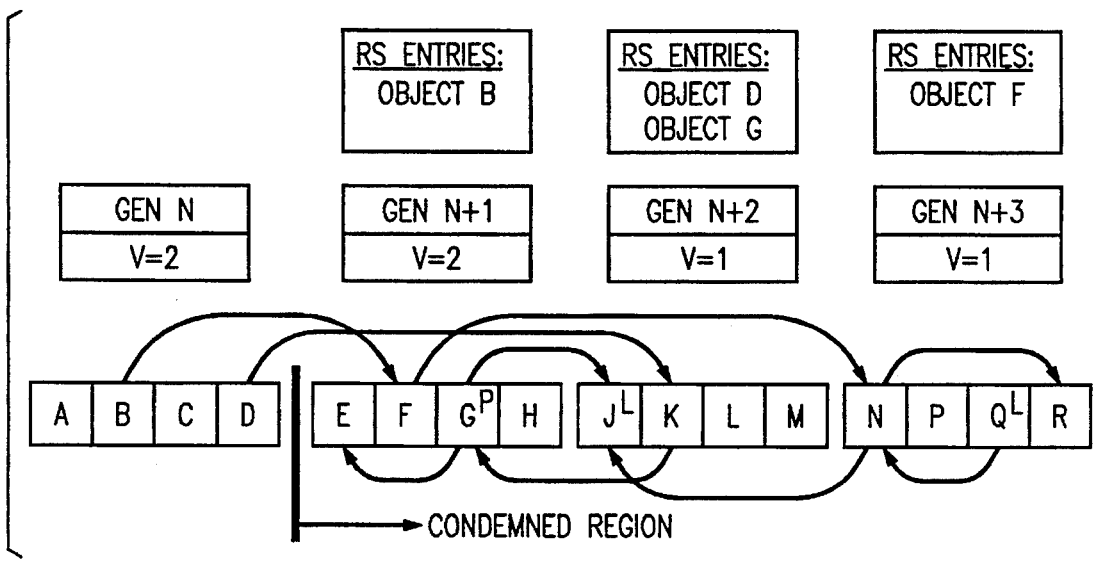
FIG. 8 shows a block diagram of objects of FIG. 5, after a first phase of this invention has performed its function.

In FIG. 8, the memory map of FIG. 7 is shown after phase 1 has completed. In this first phase, the condemned region is selected. All generations within the condemned region are to be scanned by subsequent phases for unreachable objects. In this example, all generations with a version number of 1 or less were selected to be pan of the condemned region. After the condemned region is selected, the version number of each generation in the condemned region is incremented by 1, as shown in FIG. 8. At this point, and during subsequent phases through phase 5, the condemned region continues to grow as new objects are created.

Tasks

Fundamental tasks within this phase are:

Determine the version number of the generations to be condemned and select an initial value for the cycle stealing interval.

Increment the version number of a condemned generation.

Forward Progress

This phase employs no forward progress measures as its expected cost is much less than any other phase. Typically this phase completes within a cycle. Thus, no forward progress measures are needed.

Phase 2 Generation Compaction

This phase may or may not be run in any given duty cycle. This phase searches generational data structures within the condemned region for generations that do not contain objects, or generations that contain very few objects. The generations which do not contain objects are removed from the generation list and the data structures are reclaimed. Generations which contain few objects are compacted so that N generations are constructed where previously M generations existed, where M is greater than N. This generational compaction minimizes memory used by the garbage collector.

To this end, all generations within the condemned region are sequentially visited. In each generation, the sum of the count field (Table 2) is examined. If the count field is zero, then the generational data structure is removed by linking the previous and subsequent generational data structures. If the count field in two or more adjacent generations is equal to or less than a predetermined number, the generations are compacted. One or more of the generations are removed, as above, and all objects belonging to the removed generations are copied to the remaining generation. The object headers are notified to change the generation number of each object.

Tasks

Fundamental tasks within this phase are:

Overhead of entering the cycle.

Determine if generation n may be collapsed into an older generation.

Move the objects from a generation being collapsed into new generation(s).

Scan the remembered set of the generation being collapsed.

Scan and move a valid remembered set entry of the generation being collapsed.

Scan and remove an invalid remembered set entry of the generation being collapsed.

This phase may terminate a cycle after collapsing adjacent generations but before all remembered set entries have been validated. At the beginning of the next cycle any remaining remembered set entries are validated before collapsing other generations.

Forward Progress

This phase generally completes quickly and uses a forward progress measure based on the number of cycles taken. The cycle steal interval is doubled every nth cycle where n is a parameter, typically 4. Thus, if the phase takes more than 4 cycles the cycle steal interval is doubled, more than 8 cycles it is quadrupled, etc.

Phase 3 Remembered Set Scan

In the remembered set scan, all remembered sets for all generations within the condemned region are scanned and all objects referenced by objects from generations prior to the condemned region are marked. Each generation's remembered set entries are verified to ensure that they point to a valid object in a prior generation which references an object within the generation in question. All invalid remembered set entries are removed.

The remembered set scan verifies that all the objects within the condemned region are ultimately referenced from a root object or prior-in-time object (which is assumed to be referenced from a root object). The marked objects provide a basis for marking the rest of the objects in the condemned region, because, as previously stated, all computation begins with root objects and all computational objects are referenced by root objects. The objects pointed to by remembered sets thus provide the basis for marking objects in the condemned region.

First, the remembered set entry is tested for validity. The remembered set entry is valid if the pointer to the older object points to an extant object. The pointer to class definition object field in the older object's header (Table 1) must be valid. If the offset field has the distinctive value (−1 in the preferred embodiment) the object reference is found in the pointer to class definition object field, as opposed to the data block of the object, else the reference is found at the given offset within the object's data. The offset field must be within the range of the older object's data. The remembered set scan then follows the object reference and determines if the referenced object is an extant object within the generation being scanned. If any of these conditions are not met, the remembered set entry is deleted. For each valid remembered set entry data structure, the referenced object indicated in the remembered set entry is marked.

Figure 9:
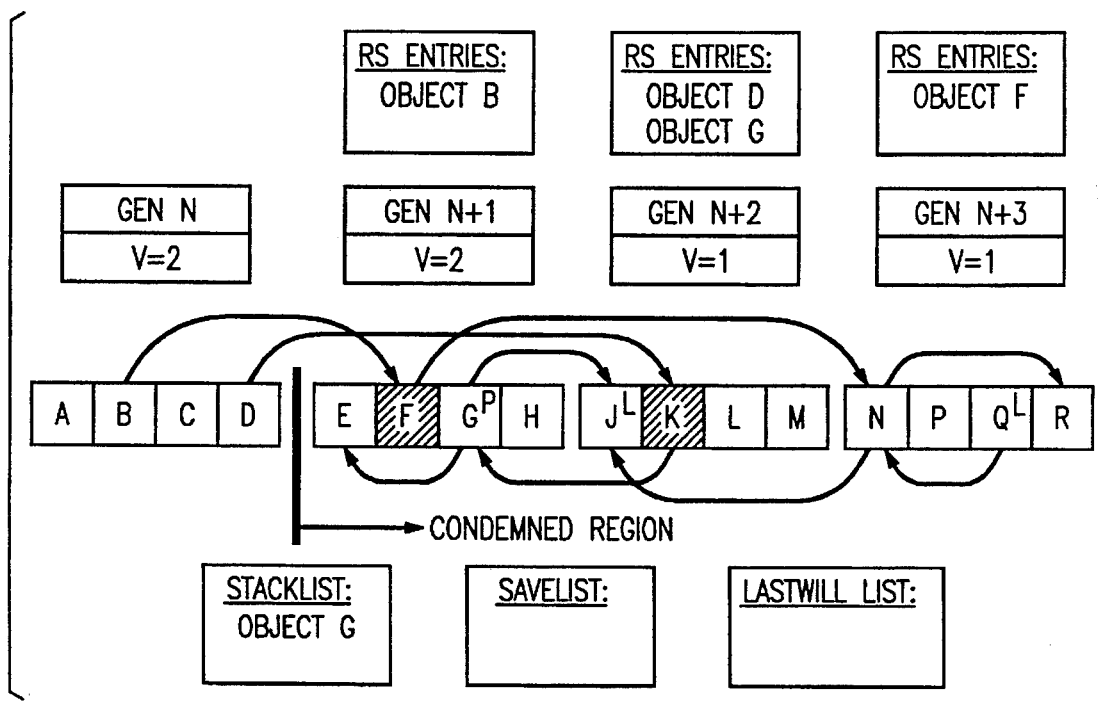
FIG. 9 shows the block diagram of FIG. 6 after a third phase of the preferred embodiment of this invention has completed.

FIG. 9 shows the block diagram of FIG. 8 after the remembered set scan. In this exemplary embodiment, object F in generation N+1 and object K in generation N+2 are referenced from valid objects in generations prior to the condemned region and were, therefore, marked as referenced (as indicated by the cross hatching). The other objects in remembered set data structures are from generations within the condemned region, and are therefore not yet marked.

Tasks
Fundamental tasks within this phase are:
Overhead of entering the cycle.
Overhead of setting up a generation scan.
Scan a remembered set of a generation.
Scan a remembered set entry.
Remove an invalid remembered set entry.
Forward Progress
A target number of objects which can be allocated during the phase is set (a parameterizable variable). After the first cycle of the phase, a generation scan rate is computed based on the "default" cycle steal interval and the current size of the condemned region. This scan rate is the rate at which the number of generations remaining to scan must be reduced each cycle if no more than a preselected number of objects are to be allocated during the phase. After each cycle the number of generations left to be scanned is checked to determine if it is "decaying" at the targeted scan rate. If it is determined that the phase is more than 5 generations (also a parameterizable value) ahead (or behind) the target, based on scan rate, then the cycle steal interval is doubled (halved).

Phase 4—Condemned Region Scan

Figure 10:
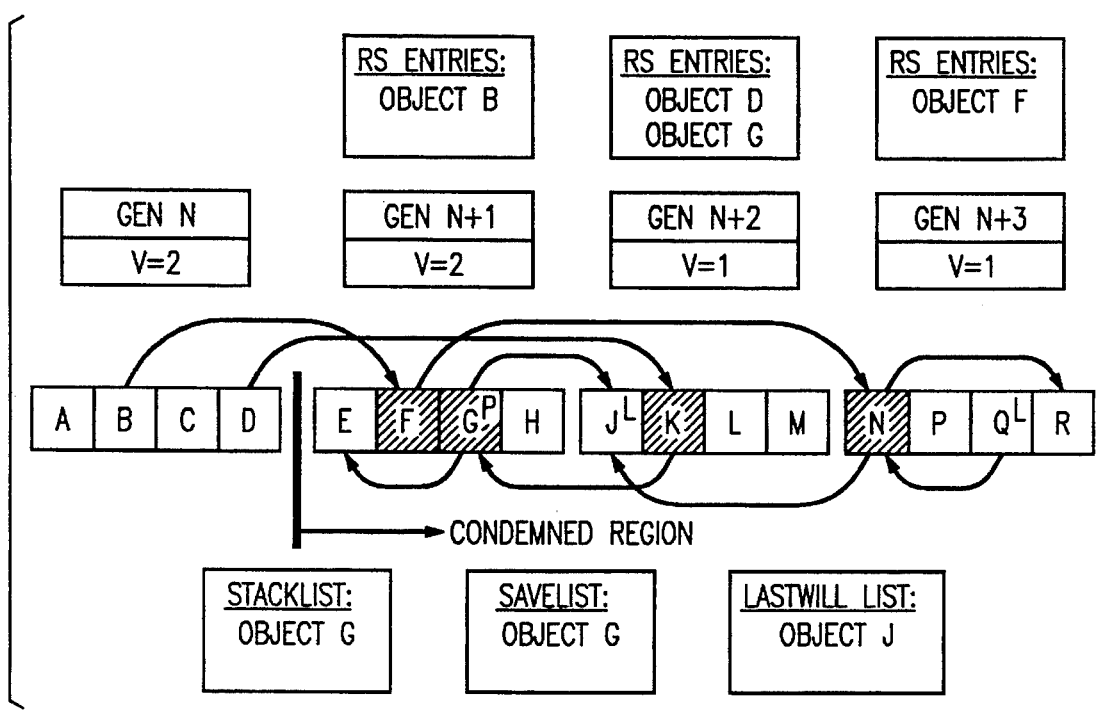
FIG. 10 shows the block diagram of FIG. 7 after a first pass of a fourth phase of the preferred embodiment of this invention has run.
Figure 11:
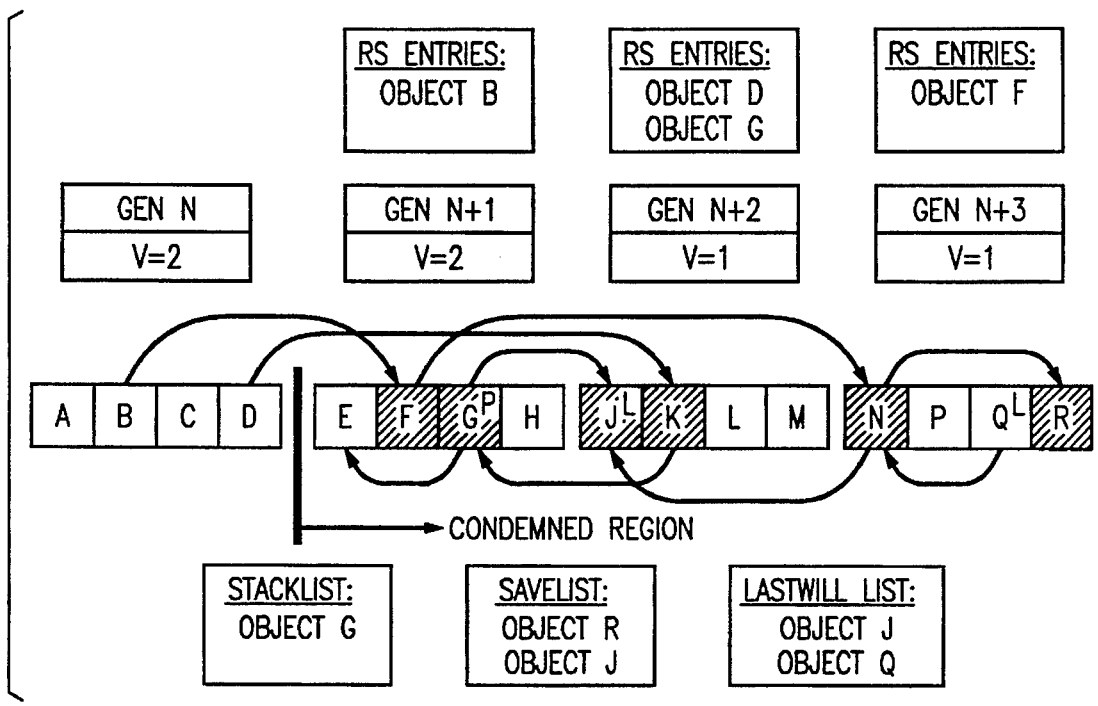
FIG. 11 shows the block diagram of FIG. 8 after a further pass of the fourth phase of the preferred embodiment of this invention has run.
Figure 12:
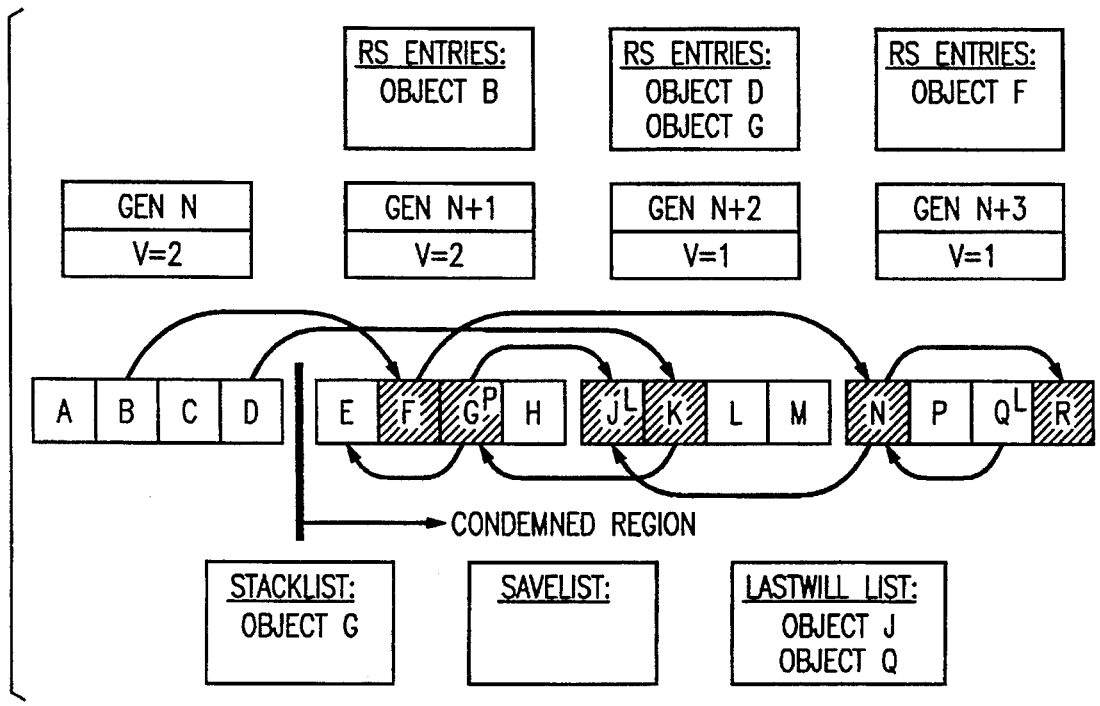
FIG. 12 shows the block diagram of FIG. 9 after the fourth phase has completed.

The condemned region scan is illustrated in FIGS. 10–12. This phase is an incremental mark/sweep garbage collector, performing a breadth-first search. During this phase, all objects in the condemned region will be visited at least once. Additionally, a list of unmarked objects with the LASTWILL flag set is made. After this phase has run, all objects reachable from objects in generations prior to the condemned region have been marked, with the exception of objects reachable from process stacks, which will be discussed in connection with Phase 6.

The condemned region scan and subsequent phases through Phase 7 make a list of objects that are marked as referenced, but have not been checked for further references, called, in this embodiment, a "SAVELIST." Additionally, object assignment (reference creation) may place an object on the SAVELIST, to avoid losing references to objects that are dynamically added to or changed in the set of reachable objects. By using the SAVELIST to record marked objects, the garbage collector may continue on its breadth-first sweep, and then return and process objects on the SAVELIST. Performing a breadth-first search using the SAVELIST is easier to segment into distinct real-time segments than, for example, a recursive decent.

In this phase, the condemned region is traversed, starting from the oldest object in the oldest generation in the condemned region. In FIG. 9, the generations, N, N+1, N+2 and N≠are shown. As shown in FIG. 9, objects B and D from outside of the condemned region reference objects F and K, respectively, within the condemned region, which were marked during the previous phase.

Each object is either marked or unmarked. If an unmarked object is encountered during the condemned region scan and it is tagged as a LASTWILL object, as denoted by the superscript letter "L" in the drawings, it is placed on the LASTWILL list. When a marked object is encountered, the garbage collector searches the object for references to unmarked objects within the condemned region, unless the marked object is on the SAVELIST, in which case no action is taken. The content category field (Table 1) indicates how the object's data is scanned for object references. If the content category field indicates the object's data contains no object references, the object's data will not be scanned. If the content category field indicates the object data contains only object references, then each element of the object's data is known to be an object reference. If the content category field indicates the object data contains some mixture of object references and primitive data items, then a map of the object's data area contained in the class description object (as pointed to by the pointer to class definition object field, Table 1) is used to determine which elements of the object's data are object references. Additionally, for every object, the pointer to class definition object field contains a reference to an object which must be accounted for as an object reference.

For each such object reference, as determined above, the referenced object (if currently unmarked) is marked, and if the referenced object is in a prior or contemporary generation, it is placed on the SAVELIST and has its SAVELIST flag set.

Following the scenario in FIG. 9, the condemned region is scanned from the oldest object, object E, towards the newest object, object R. Object E is unmarked and not tagged as LASTWILL so no action is taken. Object F refers to object N in a younger generation so object N is marked. Objects G and H are unmarked so no action is taken. This completes the scan of generation $G_{N+1}$. After a generation is scanned the SAVELIST is examined to determine if any objects previously unmarked and now marked need to be scanned. In our example the SAVELIST is empty so no action is taken. A scan of generation $G_{N+2}$ begins. Object J is unmarked but is tagged as a LASTWILL object so it is added to the LASTWILL list. Object K references object G in a prior generation. Object G is marked and added to the SAVELIST. Objects L and M are unmarked and require no action.

FIG. 10 shows the state of the system at this point. The SAVELIST is not empty and is now processed. Object G is removed from the SAVELIST and examined. The superscript letter "P" in object G indicates that object G is a process stack object. Since it is a process stack object it is not scanned at this time, because it will be processed during Phase 6, stack scan. Scanning proceeds with generation $G_{N+3}$. Object N references objects R and J. The objects are both marked and placed on the SAVELIST because they are in contemporary or prior generations. Object P requires no action. Object Q is unmarked and tagged as LASTWILL object so it is added to the LASTWILL list. Object R is on the SAVELIST so no action is taken. FIG. 11 shows the state of the objects at this point.

The SAVELIST is now processed. Object R is scanned and no additional references are found. Likewise, object J is scanned and no additional references to unmarked objects are found. The SAVELIST is empty. No further generations remain to be scanned, thus completing the condemned region scan. FIG. 12 shows the state of objects at the end of the condemned region scan. At this point all unmarked objects are presumed to be unreachable with the exception of those reachable only from process stack objects.

Tasks
Fundamental tasks within this phase are:
Overhead of entering the cycle.
Overhead of setting up a generation scan.
Overhead of setting up an object scan.
Scan an element within an object containing only object references.

Scan an element within an object containing a mix of object references and primitive data items.
Add an object reference to the SAVELIST.
Add an object reference to the LASTWILL list.
Process objects on the SAVELIST
  Forward Progress
A target number of objects which can be allocated during the phase is set (a parameterizable variable). After the first cycle of the phase, a generation scan rate is computed based on the "default" cycle steal interval and the current size of the condemned region. This scan rate is the rate at which the number of generations remaining to scan must be reduced each cycle if no more than a preselected number of objects are allocated during the phase. After each cycle the number of generations left to be scanned is checked to see if it is "decaying" at the targeted scan rate. If it is determined that the phase is more than 5 generations (also a parameterizable variable) ahead (or behind) the target, based on scan rate, then the cycle steal interval is doubled (halved).

Phase 5—Determine End of Condemned Region

Up to this point, the object-oriented program-controlled system has been allocating objects, and the condemned region has been growing accordingly. All objects, even into the most recently allocated generations, have been scanned using the preceding method. The most recently allocated generation is made the last generation of the condemned region. Even if the last generation does not have the full number of objects per generation, a new generation is started, which is beyond the condemned region. This step guarantees that cycles within the next phase (process stack scan) can run in bounded time, because new objects pushed onto the stack would have to be trapped which would be prohibitively expensive or cause a recursive scan of stacks, for which it is impossible to set a real-time bound.

Tasks
Determine last generation.
  Forward Progress
This phase only takes one cycle.

Phase 6—Process Stack Scan

FIG. 12 illustrates a memory map at the beginning of Phase 6. With the exception of objects reachable from process stacks, all objects that are reachable from outside of the condemned region have been marked, as indicated by the cross hatch. In this preferred embodiment, the garbage collector maintains a data structure that identifies all stacks used in the system ("STACKLIST"). Each stack object has a field that points to the location in memory of the top of the stack. As stack objects are created, they are added to the STACKLIST by the assignment trap. Entries in the STACKLIST are deleted only by this phase of the garbage collector.

There are two general rules for determining whether a stack should be scanned for object references: 1. a stack is scanned if it is not in the condemned region, and, 2. a stack is scanned if it is in the condemned region and the stack object was previously marked as reachable from another object.

Since stacks can have references to other objects including stack objects, such stack objects may not be marked the first time through the STACKLIST. Hence, the STACKLIST must be processed repetitively until no marked stack objects are found on the list. As a process stack is scanned, the stack reference in the STACKLIST is moved to a temporary data structure called "NEW STACKLIST." Any stack objects remaining on the STACKLIST are unreachable and will be reclaimed in Phase 8. At the end of this phase, the NEW STACKLIST becomes the operational STACKLIST.

Figure 13:
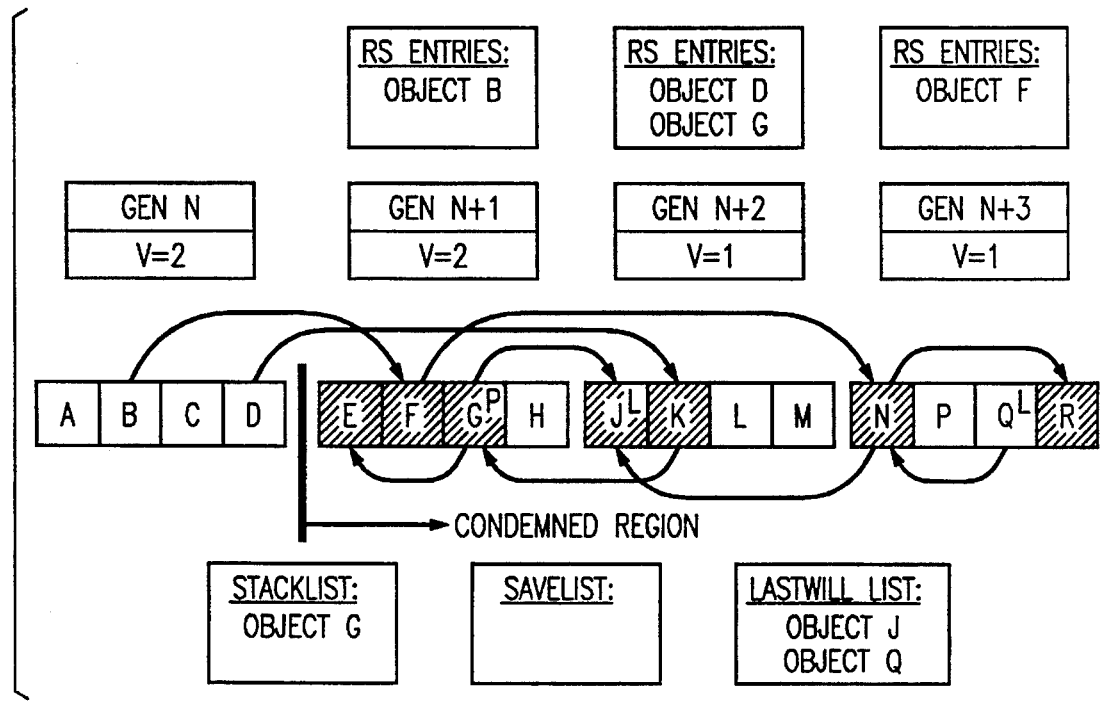
FIG. 13 shows the block diagram of FIG. 10 after the sixth phase has completed.

In the example of FIG. 12, only one stack object exists in the system, object G. It refers to objects E and J. Object E is marked and placed on the SAVELIST. Object J is already marked so no action is taken on it. The SAVELIST is then processed and object E is removed. It refers to no other objects, therefore, processing is complete. FIG. 13 shows the state of the system after the completion of the process stack scan phase. All unmarked objects are now presumed to be unreachable (objects H, L, M, P, Q).

The stack scanning phase must also run within bounded time. References created on stacks cannot efficiently be trapped in the same manner as references created in any other object. The major problem in sweeping stacks is that object references on a stack can move on the stack without detection by the garbage collector, because they are not tracked. For instance, some portion of the active stack could be scanned for references; the garbage collector cycle could terminate; normal processing could result in a reference in the unscanned portion of the stack to move into an area already scanned by the garbage collector; the next cycle of the garbage collector would then miss the moved object reference. It is important to note that the only references that could be missed are those in the unscanned portion of the stack.

To solve this problem, the garbage collector will only scan a process stack to within a threshold time remaining within the current cycle. This threshold is always the amount of time needed to copy the unscanned portion of the process stack to a temporary data structure (SAVESTACK AREA). Thus, if the garbage collector determines that there is only enough time in the current cycle to copy the unscanned portion of the stack, the unscanned portion is copied and the current cycle terminates (in bounded time).

The next garbage collector cycle begins by scanning the SAVESTACK AREA. This may or may not complete within one cycle. At some point, the scanning of the SAVESTACK AREA completes and the next stack is scanned.

Figure 14:
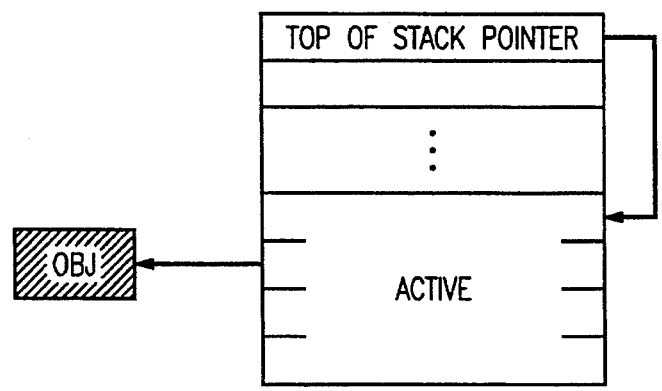
FIG. 14 illustrates a stack as operated on by the sixth phase.
Figure 15:
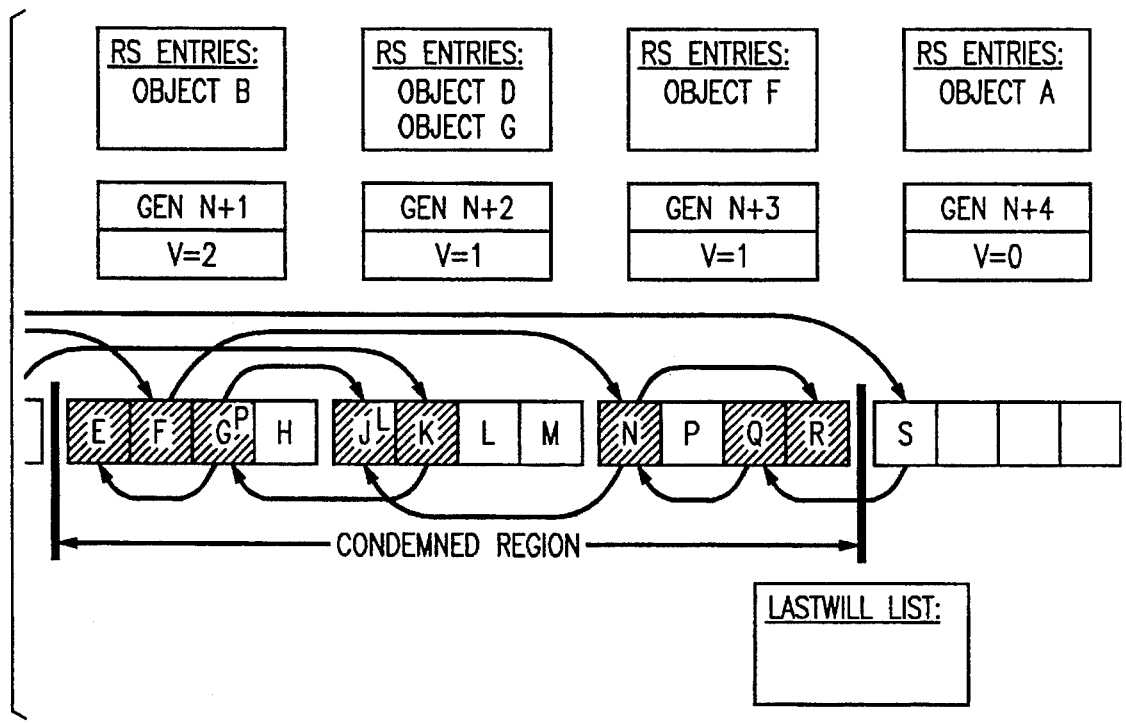
FIG. 15 shows the block diagram of FIG. 11 after the seventh phase has completed.
Figure 16:
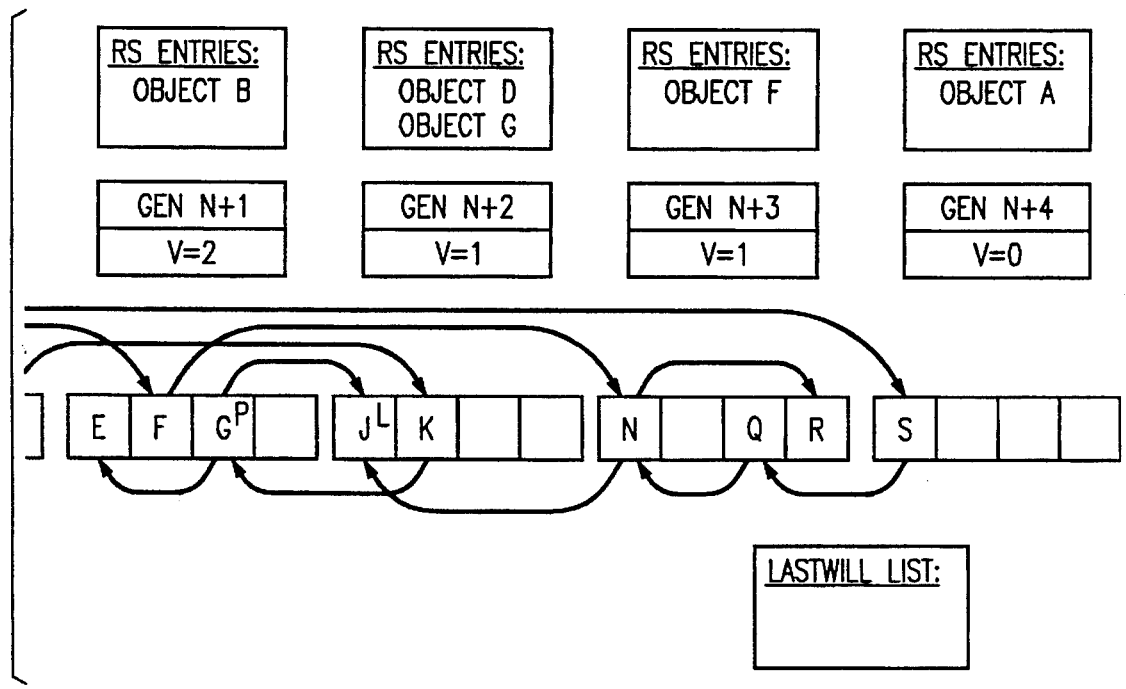
FIG. 16 shows the block diagram of FIG. 13 after all eight phases of a garage collector according to the preferred embodiment of this invention have been completed.

The scan of an individual stack is illustrated in FIG. 14. The garbage collector scans the active portion of each stack (as identified by the top of the stack pointer found in the first element of the process stack object). For each element in the active portion of the stack, a test is made whether the element is an object reference. In order to be an object reference, the stack element must have a bit pattern that indicates a number that is within the memory map of the object data structure area. If the bit pattern is within the object map, then an object reference has been identified and a test is made whether the object is in the condemned region. If the object is in the condemned region and currently unmarked, the object is marked as referenced and added to the SAVELIST.

Because process stack objects may contain non-object references, it is possible to interpret a stack word as an object reference when, in the context of the way the stack is using it, it is not an object reference. However, this scenario will happen rarely, and when it does, if the object was indeed unreachable, saving it will cause no harm. The SAVELIST is processed at the beginning of every process stack scan cycle.

An exception to the use of the stack pointer to identify the top of the stack is when the garbage collector is running on the stack to be scanned. In this case, the garbage collector pushes all machine registers that may contain object references on the top of the stack and uses the machine stack pointer to identify the active portion of the stack. Processing may then proceed as above.

Any stack objects which were not moved to the NEW STACKLIST will be reclaimed as garbage in the final phase. The NEW STACKLIST becomes the STACKLIST. At the end of this phase all reachable objects within the condemned region have then been marked as referenced.

Tasks

Fundamental tasks within this phase are:

Overhead of entering the cycle.

Scan a process stack object.

Scan a word of the active portion of a process stack object trivially determined not to be an object reference.

Scan a word of the active portion of a process stack requiring non-trivial logic to determine whether or not it is an object reference.

Add an object reference to the SAVELIST.

Copy the stack to a temporary location.

Process objects on the SAVELIST.

Note that the stack copy task does set a bound on the maximum stack size within the system. This is a minor constraint.

Forward Progress

This phase generally completes quickly in the preferred embodiment and use a forward progress measure based on the number of cycles. The cycle steal interval is doubled every nth minor cycle (where n is parameterizable, 4 is typical). Thus, if the phase takes more than 4 cycles the cycle steal interval is doubled, more than 8 cycles it is quadrupled, etc.

Phase 7—LASTWILL Processing

LASTWILL processing permits an object with a "finalize" method to perform one or more tasks before the resources associated with the object are reclaimed. In this preferred embodiment, the scheduler object will send a finalize message to all objects with the LASTWILL flag set in the object header (see above) and, in response, the object will perform the method associated with the finalize message. The actions taken may include deallocating non-memory resources (such as I/O devices, ports, trunks, lines and service circuits). Objects may also, in their finalize method, send messages to other objects in order to establish a reference to itself or other previously unreachable objects from the set of reachable objects, thus preventing the reattached object or objects from being reclaimed in Phase 8.

FIG. 13 illustrates the state of the system after the stack scan phase has completed. A LASTWILL list was established and populated during Phase 4, the condemned region scan. As noted above, if during the condemned region scan the garbage collector encountered an unmarked object and the LASTWILL bit was set, the object was added to the LASTWILL list. In this figure, the LASTWILL list contains two objects, J and Q.

Since further processing may have changed an object on the LASTWILL list from unmarked to marked, the garbage collector first processes the LASTWILL list by examining each object sequentially and checks to determine if the object is still unmarked. If the object is marked the garbage collector ignores the marked object. If the object is still unmarked, the garbage collector copies the object reference from the LASTWILL list to a NEW LASTWILL list. All objects on the NEW LASTWILL list are unreachable and need to be sent a finalize message.

The actual sending of the finalize message to objects referenced by the LASTWILL array object is independent of the garbage collector. Therefore, the scheduler may still have object references in the LASTWILL array object from a previous duty cycle.

In order to prevent the scheduler from processing the LASTWILL array object while the garbage collector is manipulating it, a check is made if the scheduler object has a reference to a LASTWILL array object. If the scheduler object has a reference to a LASTWILL array object, the garbage collector creates a new LASTWILL array object large enough to accommodate the references to objects on the NEW LASTWILL list and the objects in the old LASTWILL array object. The garbage collector removes the scheduler's reference to the LASTWILL array object, so that the scheduler object does not send a finalize message to any objects while the garbage collector is modifying the LASTWILL array object. If the scheduler object does not have a reference to a LASTWILL array object, the garbage collector creates a new LASTWILL array object.

Next, the garbage collector assigns each object in the NEW LASTWILL list to the LASTWILL array object and clears the LASTWILL flag in each object. As objects are assigned to the LASTWILL array object, the assignment is trapped and the object is placed on the SAVELIST. The SAVELIST is periodically processed and all objects on the SAVELIST are scanned for references to unmarked objects within the condemned region. The unmarked objects are marked and placed on the SAVELIST. This continues until the SAVELIST is empty and all LASTWILL objects have been assigned to the LASTWILL array object. As a last task in this phase, the garbage collector causes the LASTWILL array object to be assigned to the scheduler object which reattaches the LASTWILL objects and all objects reachable from these objects to the set of reachable objects. At this point LASTWILL processing is completed.

At a subsequent time, the scheduler object will send a finalize message to each object referenced by the LASTWILL array object. The objects will then take whatever action is required by the finalize method of the object. This may be, for example, to release all physical resources protected by the object. In the example of FIG. 2, the path object 240 releases the path through the network. Additionally, the object may, as part of its finalize method, cause a reference to itself to be created in a reachable object, thus reattaching itself to the set of reachable objects. The scheduler object then removes the reference to the object which received the finalize message. If any of the previously unreachable objects are not reattached to a reachable object as a result of the finalize method, the object or objects will be reclaimed on a subsequent duty cycle of the garbage collector.

Tasks

Fundamental tasks within this phase are:

Overhead of entering the cycle.

Overhead of scanning a candidate object on the LASTWILL list.

Scan an element of an object containing only object references.

Scan an element of an object containing a mix of object references and primitive data items.

Add an object reference to the SAVELIST.

Add an object reference to the LASTWILL array object.

Attach LASTWILL array object to the scheduler object.

Process objects on the SAVELIST.

Forward Progress

This phase generally completes quickly and uses a forward progress measure based on the number of cycles. The cycle steal interval is doubled every nth cycle (where n is parameterizable, 4 is typical). Thus, if the phase takes more than 4 cycles the cycle steal interval is doubled, more than 8 cycles it is quadrupled, etc.

Phase 8 Garbage Reclamation

After the LASTWILL phase, all objects within the condemned region that are not marked as referenced are guaranteed to be garbage. For each generation in the condemned region, the garbage collector sequentially checks each object in the generation to determine if the object is marked. If the object is marked, the object is then unmarked. If the object is not marked, the object is removed from the generation and memory resources associated with the object are freed.

Tasks
Overhead of entering the cycle.
Overhead of setting up a generation scan.
Free a generation.
Overhead of setting up an object scan.
Free an object.

Forward Progress

A target number of objects which can be allocated during the phase is set (a parameterizable variable). After the first cycle of the phase, a generation scan rate is computed based on the "default" cycle steal interval and the current size of the condemned region. This scan rate is the rate at which the number of generations remaining to scan must be reduced each cycle if no more than a preselected number of objects are to be allocated during the phase. After each cycle the number of generations left to be scanned is checked to determine if it is "decaying" at the targeted scan rate. If it is determined that the phase is more than 5 generations (a parameterizable value) ahead (or behind) the target, based on scan rate, then the cycle steal interval is doubled (halved).

Compaction

A real-time compaction process can now be run to pack the active objects (header and data) into one area. This process is orthogonal to memory reclamation. By this decoupling, compaction may be scheduled independently of the garbage collector activity. At some level, however, the two processes will need to cooperate to avoid simultaneous manipulation of the same data.

It is to be understood that the above-described embodiment is merely illustrative of the principles of the invention and that many variations may be devised by those skilled in the art without departing from the scope of the invention. It is therefore intended that such variations be included within the scope of the appended claims.

We claim:

1. A method for effecting recovery of memory resources for use by a digital data processing system, said digital data processing system comprising a computer, said digital data processing system performing real-time operations, said digital data processing system including a limited amount of memory, wherein said digital data processing system performs said real-time operations by sending ones of a plurality of messages to selected ones of a plurality of objects, said plurality of objects being allocated when needed for a specific functionality of said real-time operations and wherein a portion of said limited amount of memory is assigned to each object as said object is allocated, each of said plurality of objects being referenced when at least one other object may send a message to the object, ones of said plurality of objects becoming unreferenced when that object's functionality is no longer needed by the referencing object, said plurality of objects being stored in memory in a time-ordered sequence according to when they were allocated, and each of said plurality of objects being either marked or unmarked, wherein each of said plurality of objects is initially unmarked, said method executing in said computer as a program comprising the steps of:

a. determining a dynamically growing condemned region of said memory by selecting a first object from said time-ordered plurality of objects as a beginning of said condemned region of said memory, said condemned region of said memory including all objects allocated after said first object;

b. marking all objects within said condemned region of said memory that are referenced from any of said time-ordered plurality of objects that were allocated prior to said first object;

c. marking objects within said condemned region of memory that are referenced from all objects within said condemned region of memory that are marked in accordance with step b;

d. determining as a last object of said condemned region of memory a most recently allocated object, so that said condemned region includes all objects allocated between said first object and said last object, and so that no object allocated later in time than said last object is included in said condemned region; and e. deallocating memory resources, for use in allocating new objects in said limited amount of memory, associated with unmarked objects within said condemned region of memory;

wherein each of said steps a through e comprises one or more cycles of operation, each of said cycles comprises one or more tasks, each task comprises a short, uninterruptible operation of said recovery process, wherein the latency of each task is deterministic, each pair of adjacent cycles is separated by performance of said real-time operations, and execution of each cycle is limited to a predefined fine-grained time period without replicating objects.

2. A method according to claim 1 wherein execution of said cycles is triggered by allocation of a predefined number of objects.

3. A method according to claim 2 wherein the frequency of said triggering of said cycles is variable.

4. A method according to claim 3 wherein said triggering of said cycles varies dependent upon an amount of forward progress made by a given one of said steps a through e and any step performed previous to said given step; wherein determining said amount of forward progress comprises comparing a total number of objects in the condemned region of memory allocated during said given step and all of said previous steps to a predetermined number.

5. The method of claim 4 comprising;

in response to determining that said total number of objects in said condemned region is greater than said predetermined number, increasing said frequency of said triggering of said cycles.

6. A method according to claim 5 wherein determining said amount of forward progress further comprises, after comparing said total number of objects in the condemned region of memory allocated during said given step and said previous steps to a predetermined number, in response to determining that said total number of objects is less than said predetermined number, decreasing said frequency of said triggering of said cycles.

7. A method according to claim 1 wherein said step of marking objects referenced from said marked objects within said condemned region of memory comprises sequentially traversing said condemned region of memory from said first object to any most recently defined objects and determining whether each object is marked;

if one of said plurality of objects is marked, determining whether said marked object references another object within said condemned region of memory and marking said referenced object.

8. A method according to claim 7 further including placing said marked referenced object on a SAVELIST, and, at a subsequent time, determining whether an object on said SAVELIST references another object within said condemned region of memory, and if so, marking said other object and placing said other object on said SAVELIST.

9. A method according to claim 8 wherein said other marked referenced object is placed on the SAVELIST if said other marked, referenced object is in a generation contemporary or prior to the generation of said marked referenced object.

10. A method according to claim 1 wherein said digital data processing system uses stacks for a portion of its processing and wherein said plurality of objects comprises stack objects and non-stack objects, said stack objects also being either marked or unmarked, and being initially unmarked, and wherein some of said stack objects are referenced by non-stack objects, said method further including the step of after said step of determining a last object of said plurality of objects, marking objects in said condemned region referenced from marked stack objects that are referenced by marked objects in said condemned region and that are referenced by objects that were allocated prior to said first object.

11. A method according to claim 10 wherein if marking objects in said condemned region referenced from a specific stack object comprises more than one cycle, copying said stack and completing marking objects in said condemned region referenced from said copied stack in one or more subsequent cycles.

12. A method according to claim 1 wherein a plurality of remembered sets contain references to ones of said plurality of objects within said condemned region from objects allocated prior to said first object of said condemned region, wherein said step of marking objects within said condemned region that are referenced from objects allocated prior to said first object comprises traversing said remembered sets and marking referenced objects in said condemned region of memory that are referenced from objects allocated prior to said first object.

13. A method according to claim 12 wherein said step of traversing said remembered set comprises validating that said objects allocated prior to said first object reference said objects in said condemned region of memory.

14. A method according to claim 1 wherein said plurality of objects are grouped in memory into generations, each of said generations comprising a predefined number of objects, said method further comprising the step of after said step of determining a condemned region, compacting a plurality of generations by regrouping adjacent generations together to form one generation when adjacent ones of said plurality of generations comprise a predetermined number objects or less.

15. A method according to claim 1 wherein, when a reference to one of said plurality of objects changes, a determination is made whether an object with the changed reference was allocated before the referenced object;

if said referencing object was allocated before said referenced object, then a remembered set is created which is associated with said referenced object comprising a reference to said referencing object.

16. A method for effecting recovery of memory resources for use by a digital data processing system performing real-time operations, said digital data processing system comprising a computer, said digital data processing system including a limited amount of memory, wherein said digital data processing system performs said real-time operations by sending ones of a predefined plurality of messages to selected ones of a plurality of objects, said plurality of objects being allocated when needed for a specific functionality of said real-time operations and wherein a portion of said limited amount of memory is assigned to each object as said object is allocated, each of said plurality of objects being referenced when at least one other object may send a message to the object, ones of said plurality of objects becoming unreferenced when that object's functionality is no longer needed by the referencing object, said plurality of objects being stored in memory in a time-ordered sequence according to when they were allocated, said plurality of objects being grouped into a plurality of generations each containing approximately the same number of objects, and said plurality of objects being either marked or unmarked, each of said plurality of objects being initially unmarked, said method executing in said computer as a program comprising the steps of:

a. selecting a contiguous one or more of said plurality of generations as a dynamically growing condemned region of said memory by selecting a first generation from said plurality of generations as a beginning of said condemned region of said memory, said condemned region of said memory including all generations created after said first generation, b. marking all objects within said condemned region of said memory that are referenced from any of said time-ordered plurality of objects that were allocated prior to said first generation;

c. marking objects within said condemned region of memory that are referenced from all objects within said condemned region of memory that are marked in accordance with step b;

d. determining a last generation of said plurality of generations as an end of said condemned region of memory; and e. deallocating memory resources, for use in defining new objects in said limited amount of memory, associated with unmarked objects within said condemned region of memory;

wherein each of said steps a through e comprises one or more cycles of operation, and each of said cycles comprises one or more tasks, each task comprising a short, uninterruptible operation of said recovery process, wherein the latency of each task is deterministic, said method further comprising the step of performing real-time operations between said cycles and between steps a–e as required by said computer without replicating objects.

17. A method according to claim 16 wherein execution of said cycles is triggered by allocation of at least a predefined number of objects.

18. A method according to claim 17 wherein the frequency of said triggering of said cycles is variable.

19. A method according to claim 18 wherein said triggering of said cycles varies dependent upon an amount of forward progress made by the current and previous steps, wherein determining said amount of forward progress comprises comparing a number of generations allocated during said current and previous steps to a predetermined number.

20. A method according to claim 19 wherein, in response to determining that said number of generations is greater than said predetermined number, increasing said frequency of said triggering of said cycles.

21. A method according to claim 19 wherein, in response to determining that said number of generations is less than said predetermined number, decreasing said frequency of said triggering of said cycles.

22. A method according to claim 16 wherein said digital data processing system uses stacks for a portion of it processing and wherein said plurality of objects comprise stack objects and non-stack objects, said stack objects also being either marked or unmarked, and being initially unmarked, and wherein some of said stack objects are referenced by non-stack objects, said method further including the step of after said step of determining a last generation of said plurality of generations, marking objects in said condemned region referenced from said stack objects referenced by marked objects in said condemned regions and that are referenced by marked objects that were allocated prior in time to said first generation.

23. A method according to claim 22 wherein said step of marking objects in said condemned region referenced from said stack objects comprises one or more cycles, and if said step of marking objects in said condemned region referenced from said stack objects require more than one cycle, copying said stack and completing said step of marking objects in said condemned region referenced from said copied stack in one or more subsequent cycles.

24. A method according to claim 16 wherein a plurality of remembered sets are associated with one or more of said plurality of generations, each of said remembered sets containing references to ones of said objects in its associated generation from objects allocated prior to said generations in said condemned region, wherein said step of marking objects within said condemned region of memory that are referenced from outside of said condemned region of memory comprises traversing said remembered sets and marking referenced objects in said condemned region of memory that are referenced from objects outside of said condemned region of memory.

25. A method according to claim 24 wherein said step of traversing said remembered sets comprises validating that said objects allocated prior to said first generation reference said objects in said condemned region of memory.

26. A method according to claim 16 wherein said step of marking objects referenced from said marked objects within said condemned region of memory comprises sequentially traversing said condemned region of memory from said first object in said first generation to any most recently defined objects and determining whether each object is marked;

if one of said plurality of objects is marked, determining whether said marked object references another object within said condemned region of memory and marking said referenced object.

27. A method according to claim 26 further including placing said marked referenced object on a SAVELIST, and, at a subsequent time, determining whether said marked referenced object references another object within said condemned region of memory,and, if so, marking said other object and placing said other object on the SAVELIST.

28. A method according to claim 16 further comprising, after the step of selecting said generations comprising said condemned region, the step of determining the number of objects within each generation in said condemned region and when said number is less than a predetermined number, combining two or more of said plurality of generations into one generation.

29. A method according to claim 16 wherein, when a reference to one of said plurality of objects changes, a determination is made whether an object with the changed reference was allocated before the referenced object, if said referencing object was allocated before said referenced object, then a remembered set is added comprising a reference to said referencing object which is associated with said referenced object.

30. A method according to claim 16 wherein said step of recovering memory resources comprises sequentially examining each object within said condemned region, recovering all memory associated with unmarked objects for reallocation and unmarking all marked objects.

31. A method for effecting recovery of memory resources for use by a digital data processing system performing real-time operations, said digital data processing system comprising a computer, said digital data processing system including a limited amount of memory, wherein said digital data processing system performs said real-time operations by sending one of a predefined plurality of messages to selected ones of a plurality of objects, said digital data processing system using stacks for a portion of its processing, each of said plurality of objects being either stack objects or non-stack objects, said plurality of objects being allocated when needed for a specific functionality of said real-time operations and wherein a portion of said limited amount of memory is assigned to each object as said object is allocated, each of said plurality of objects being referenced when at least one other object may send a message to the object, ones of said plurality of objects becoming unreferenced when that object's functionality is no longer needed by a referencing object when said referencing object deletes its reference to the object, said plurality of objects being stored in memory in a time-ordered sequence according to when they were allocated, said plurality of objects being grouped into a plurality of generations containing approximately the same number of objects, each of said generations having a remembered set containing references to ones of said plurality of objects allocated prior in time to said each of said generations that reference objects within said each of said generations, and said plurality of objects being either marked or unmarked, each of said plurality of objects being initially unmarked, said method executing in said computer as a program comprising the steps of:

a. selecting a contiguous one or more of said plurality of generations as a dynamically growing condemned region of said memory by selecting a first generation from said plurality of generations as a beginning of said condemned region of said memory, said condemned region of said memory including all generations created after said first generation;

b. comparing a number of objects in each generation in said condemned region to a predefined number, and if said number of objects is less than said predefined number, combining said generation with an adjacent generation;

c. marking all objects within said condemned region of memory that are referenced from objects in generations allocated prior to said first generation by traversing said remembered sets for each generation in said condemned region of memory and marking objects in said condemned region of memory that are referenced from objects in generations allocated prior to said first generation;

d. marking objects referenced from said marked objects within said condemned region of memory by sequentially traversing said condemned region of memory from a first object in said first generation to any most recently defined object and determining whether each object is marked, and if one of said plurality of objects is marked, determining whether said one of said plurality of objects references another object within said condemned region of memory, and if said one of said plurality of objects references another object within said condemned region of memory, marking said referenced object and placing said referenced object on a SAVELIST for determining whether said marked object references another object within said condemned region of memory at a subsequent time;

e. determining a last generation of said plurality of generations as an end of said condemned region of memory;

f. marking objects in said condemned region that are referenced from stack objects allocated prior in time to said condemned region and from marked stack objects within said condemned region; and g. recovering memory resources, for use in allocating new objects in said limited amount of memory, associated with unmarked objects within said condemned region of memory by sequentially examining each object within said condemned region, removing all unmarked objects and then unmarking all marked objects;

wherein each of said steps a through g comprises one or more cycles of operation, each of said cycles comprises one or more tasks comprising a short, uninterruptible operation of said recovery process; wherein the latency of each task is deterministic, each pair of adjacent cycles is separated by performance of said real-time operations, and each cycle is limited to a predefined fine-grained time period without replicating objects.

* * * * *